United States Patent
Decamp, II et al.

(10) Patent No.: US 11,818,504 B2
(45) Date of Patent: *Nov. 14, 2023

(54) SYSTEMS AND METHODS FOR PARTICIPANT-CONTROLLED VIDEO CONFERENCING

(71) Applicant: TARGUS INTERNATIONAL LLC, Anaheim, CA (US)

(72) Inventors: Ronald Decamp, II, Long Beach, CA (US); Man Cheung Dan Tsang, Carlsbad, CA (US); Nicholas Anthony Markovsky, Yorba Linda, CA (US)

(73) Assignee: TARGUS INTERNATIONAL LLC, Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,689

(22) Filed: Jul. 11, 2022

(65) Prior Publication Data
US 2022/0345664 A1    Oct. 27, 2022

Related U.S. Application Data

(63) Continuation of application No. 17/308,351, filed on May 5, 2021, now Pat. No. 11,405,588, which is a
(Continued)

(51) Int. Cl.
*H04N 7/15* (2006.01)
*G06F 13/42* (2006.01)

(52) U.S. Cl.
CPC ......... *H04N 7/152* (2013.01); *G06F 13/4282* (2013.01); *G06F 2213/0042* (2013.01)

(58) Field of Classification Search
CPC .. G06F 1/1632; G06F 3/1423; G06F 13/4282; G06F 13/4295; G06F 3/1454;
(Continued)

(56) References Cited

U.S. PATENT DOCUMENTS

| | | |
|---|---|---|
| 5,539,616 A | 7/1996 | Kikinis |
| 5,627,974 A | 5/1997 | Watts, Jr. et al. |

(Continued)

FOREIGN PATENT DOCUMENTS

| | | |
|---|---|---|
| AU | 2014100171 A4 | 3/2014 |
| CN | 101893916 A | 11/2010 |

(Continued)

OTHER PUBLICATIONS

U.S. Appl. No. 13/365,754, et al., Final Office Action ,dated Dec. 27, 2013 ,18 pgs.

(Continued)

*Primary Examiner* — Melur Ramakrishnaiah
(74) *Attorney, Agent, or Firm* — Stoel Rives LLP

(57) ABSTRACT

A conferencing device includes a power supply, a processor, a video out module, and a USB hub in communication with the processor and drawing power from the power supply. The conferencing device is configured to provide power from the power supply to an external host device in communication with the USB hub, receive control signals and video data from the external host device, and place video data from the external host device at a video out port of the conferencing device. Embodiments herein discuss the switching between and/or simultaneous presentation of video data for placement at the video out port as between two or more external host devices connected to the conferencing device based on the control signals sent from the external host devices. The conferencing device may be connected to another conferencing device to create a single logical conferencing device that can handle an expanded number of external host devices.

20 Claims, 9 Drawing Sheets

Related U.S. Application Data continuation of application No. 16/999,778, filed on Aug. 21, 2020, now Pat. No. 11,039,105.

(60) Provisional application No. 62/890,482, filed on Aug. 22, 2019.

(58) Field of Classification Search
CPC ........ G06F 2213/0042; G06F 2370/10; H04N 7/15; H04N 7/152; G09G 2370/20; G09G 2330/21; G09G 2370/16
USPC ............................................ 348/14.01–14.16
See application file for complete search history.

(56) References Cited

U.S. PATENT DOCUMENTS

| | | |
|---|---|---|
| 5,692,400 A | 12/1997 | Bliven et al. |
| 5,751,548 A | 5/1998 | Hall et al. |
| 5,835,733 A | 11/1998 | Walsh et al. |
| 5,864,708 A | 1/1999 | Croft et al. |
| 5,873,151 A | 2/1999 | Sood |
| 5,886,424 A | 3/1999 | Kim |
| 6,029,215 A | 2/2000 | Watts, Jr. et al. |
| 6,170,026 B1 | 1/2001 | Kimura et al. |
| 6,275,378 B1 | 8/2001 | Lee et al. |
| 6,556,435 B1 | 4/2003 | Helot et al. |
| 6,604,199 B1 | 8/2003 | Yang et al. |
| 6,629,182 B1 | 9/2003 | Mizoguchi et al. |
| 6,665,805 B1 | 12/2003 | Tsirkel et al. |
| 6,804,740 B1 | 10/2004 | Watts et al. |
| 6,888,338 B1 | 5/2005 | Popescu-Stanesti et al. |
| 6,956,474 B2 | 10/2005 | Jakubowski |
| 6,976,885 B2 | 12/2005 | Lord |
| 7,000,101 B2 | 2/2006 | Wu et al. |
| 7,035,100 B2 | 4/2006 | Charles |
| 7,035,126 B1 | 4/2006 | Lanni |
| 7,062,389 B2 | 6/2006 | Johnson et al. |
| 7,099,152 B2 | 8/2006 | Gasbarro |
| 7,103,760 B1 | 9/2006 | Billington et al. |
| 7,171,461 B2 | 1/2007 | Ewing et al. |
| 7,201,611 B2 | 4/2007 | Faranda |
| 7,225,227 B2 | 5/2007 | Omura et al. |
| 7,227,747 B2 | 6/2007 | Walker et al. |
| 7,281,698 B2 | 10/2007 | Patterson, Jr. |
| 7,369,851 B2 | 5/2008 | Okkonen et al. |
| 7,403,232 B1 | 7/2008 | Orlicki et al. |
| 7,471,511 B2 | 12/2008 | Montag et al. |
| 7,532,461 B2 | 5/2009 | Krancher et al. |
| 7,542,759 B2 | 6/2009 | Edwards et al. |
| 7,596,687 B2 | 9/2009 | Sultenfuss et al. |
| 7,643,283 B2 | 1/2010 | Jubelirer et al. |
| 7,681,134 B1 | 3/2010 | Grechishkin et al. |
| 7,683,573 B2 | 3/2010 | Nikazm et al. |
| 7,704,147 B2 | 4/2010 | Quraishi |
| 7,818,480 B2 | 10/2010 | Hoerl et al. |
| 7,899,970 B2 | 3/2011 | Mori |
| 7,926,430 B2 | 4/2011 | Bakker |
| 7,976,337 B1 | 7/2011 | Cortopassi et al. |
| 8,074,581 B2 | 12/2011 | Epstein et al. |
| 8,312,199 B2 | 11/2012 | Johnson |
| 8,323,040 B2 | 12/2012 | Prest |
| 8,346,753 B2 | 1/2013 | Hayes |
| 8,352,784 B2 | 1/2013 | Burg et al. |
| 8,352,934 B1 | 1/2013 | Borole et al. |
| 8,358,943 B2 | 1/2013 | Kim |
| 8,359,356 B2 | 1/2013 | Belz et al. |
| 8,395,605 B2 | 3/2013 | Sisto et al. |
| 8,498,618 B2 | 7/2013 | Ben |
| 8,508,573 B2 | 8/2013 | Grimshaw |
| 8,510,424 B2 | 8/2013 | Ewing et al. |
| 8,522,322 B2 | 8/2013 | Wishman et al. |
| 8,601,203 B2 | 12/2013 | Holbrook |
| 8,611,076 B2 | 12/2013 | Wetzel et al. |
| 8,751,836 B1 | 6/2014 | Piszczek et al. |
| 8,762,752 B2 | 6/2014 | Inbaraj et al. |
| 8,770,482 B2 | 7/2014 | Ackermann et al. |
| 8,774,071 B2 | 7/2014 | Meng |
| 8,793,680 B2 | 7/2014 | Jeong |
| 8,797,159 B2 | 8/2014 | Kirkpatrick et al. |
| 8,799,537 B1 | 8/2014 | Zhu et al. |
| 8,879,250 B2 | 11/2014 | Franz |
| 8,884,896 B2 | 11/2014 | Tabone et al. |
| 8,896,656 B2 | 11/2014 | Epstein et al. |
| 8,909,842 B2 | 12/2014 | Johnson |
| 8,913,380 B2 | 12/2014 | Enomoto et al. |
| 8,990,469 B2 | 3/2015 | Benhard et al. |
| 9,013,283 B1 | 4/2015 | Tackaberry |
| 9,033,228 B2 | 5/2015 | Govindarajan et al. |
| 9,092,632 B2 | 7/2015 | Wishman et al. |
| 9,128,796 B2 | 9/2015 | Chitre et al. |
| 9,152,177 B2 | 10/2015 | Feldstein |
| 9,189,751 B2 | 11/2015 | Matsuoka et al. |
| 9,197,728 B2 | 11/2015 | Pedersen et al. |
| 9,224,290 B1 | 12/2015 | Mason et al. |
| 9,249,927 B2 | 2/2016 | Graham |
| 9,274,994 B2 | 3/2016 | Capezza |
| 9,304,545 B2 | 4/2016 | Ramirez et al. |
| 9,338,268 B2 | 5/2016 | Holtman |
| 9,345,357 B1 | 5/2016 | Davila, Jr. |
| 9,362,777 B2 | 6/2016 | Lau et al. |
| 9,377,814 B2 | 6/2016 | Ramirez et al. |
| 9,392,427 B2 | 7/2016 | Goldman |
| 9,411,551 B2 | 8/2016 | Haren |
| 9,444,508 B2 | 9/2016 | Lee |
| 9,456,686 B2 | 10/2016 | Epstein |
| 9,531,651 B1 | 12/2016 | Cherubini |
| D782,562 S | 3/2017 | Gustaveson, II |
| 9,602,760 B2 | 3/2017 | Griffin et al. |
| 9,612,628 B2 | 4/2017 | Halim et al. |
| 9,634,903 B2 | 4/2017 | Yan et al. |
| 9,645,812 B2 | 5/2017 | Proschowsky |
| 9,647,481 B2 | 5/2017 | Huang et al. |
| 9,696,777 B2 | 7/2017 | Pamley et al. |
| 9,712,959 B2 | 7/2017 | Haoyang et al. |
| 9,723,358 B1 | 8/2017 | Chan |
| 9,736,427 B1 | 8/2017 | Grimshaw et al. |
| 9,760,116 B2 | 9/2017 | Wylie |
| 9,778,779 B2 | 10/2017 | Chartier et al. |
| 9,794,496 B2 | 10/2017 | Soffer et al. |
| 9,829,333 B1 | 11/2017 | Calder |
| 9,829,669 B1 | 11/2017 | Leipold |
| 9,836,969 B2 | 12/2017 | Thompson et al. |
| 9,838,475 B2 | 12/2017 | Brown et al. |
| 9,854,142 B2 | 12/2017 | Freeze |
| 9,961,306 B1 | 5/2018 | Lev et al. |
| 10,001,807 B2 | 6/2018 | Chung et al. |
| 10,013,559 B2 | 7/2018 | Ali et al. |
| 10,070,021 B1 | 9/2018 | Rolle |
| 10,083,021 B2 | 9/2018 | Jamadagni et al. |
| 10,097,563 B2 | 10/2018 | Surdu et al. |
| 10,108,221 B1 | 10/2018 | Jin et al. |
| 10,203,964 B2 | 2/2019 | Johnnie et al. |
| 10,354,531 B1 | 7/2019 | Bronder et al. |
| 10,356,129 B2 | 7/2019 | Elias et al. |
| 10,409,751 B2 | 9/2019 | Grobelny |
| 10,452,096 B1 | 10/2019 | Keilers et al. |
| 10,462,611 B1 | 10/2019 | Klinkner et al. |
| 10,499,531 B2 | 12/2019 | Schmidt et al. |
| 10,578,657 B2 | 3/2020 | Decamp et al. |
| 10,623,701 B1 | 4/2020 | Bracewell et al. |
| 10,663,498 B2 | 5/2020 | Decamp et al. |
| 10,684,842 B2 | 6/2020 | Lin et al. |
| 10,705,852 B2 | 7/2020 | Vidyadhara et al. |
| 10,782,735 B2 | 9/2020 | Wylie |
| 10,789,061 B2 | 9/2020 | Dewan et al. |
| 10,802,818 B2 | 10/2020 | Kondapi et al. |
| 10,841,791 B1 | 11/2020 | Zhang et al. |
| 10,962,248 B1 | 3/2021 | Hasan et al. |
| 11,017,334 B2 | 5/2021 | Decamp et al. |
| 11,138,581 B2 | 10/2021 | Fernando et al. |
| 11,231,448 B2 | 1/2022 | Decamp et al. |
| 11,360,534 B2 | 6/2022 | Decamp et al. |
| 2002/0080132 A1 | 6/2002 | Dai et al. |
| 2002/0095533 A1 | 7/2002 | Esterberg et al. |

(56) References Cited

U.S. PATENT DOCUMENTS

| | | |
|---|---|---|
| 2002/0119800 A1 | 8/2002 | Jaggers et al. |
| 2003/0084222 A1 | 5/2003 | Wurzburg |
| 2003/0107566 A1 | 6/2003 | Shin et al. |
| 2003/0114206 A1 | 6/2003 | Timothy et al. |
| 2003/0154293 A1 | 8/2003 | Zmolek et al. |
| 2003/0182150 A1 | 9/2003 | Reddy |
| 2003/0217098 A1 | 11/2003 | Bobde et al. |
| 2003/0217142 A1 | 11/2003 | Bobde et al. |
| 2003/0222149 A1 | 12/2003 | Solomon et al. |
| 2003/0222848 A1 | 12/2003 | Solomon et al. |
| 2004/0064621 A1 | 4/2004 | Dougherty et al. |
| 2004/0088465 A1 | 5/2004 | Bianchi |
| 2004/0095713 A1 | 5/2004 | Chuang |
| 2004/0111382 A1 | 6/2004 | Haji-Ioannou |
| 2004/0116149 A1 | 6/2004 | Yukie et al. |
| 2004/0125777 A1 | 7/2004 | Doyle et al. |
| 2004/0212586 A1 | 10/2004 | Denny |
| 2004/0268163 A1 | 12/2004 | Yeh |
| 2005/0033481 A1 | 2/2005 | Budhraja et al. |
| 2005/0036283 A1 | 2/2005 | Hillman et al. |
| 2005/0057893 A1 | 3/2005 | Homer et al. |
| 2005/0114503 A1 | 5/2005 | Ruetschi et al. |
| 2005/0162824 A1 | 7/2005 | Thompson |
| 2005/0164545 A1 | 7/2005 | Rosenthal et al. |
| 2005/0180086 A1 | 8/2005 | Schaefer et al. |
| 2005/0207110 A1 | 9/2005 | Wang et al. |
| 2005/0213298 A1 | 9/2005 | Doherty et al. |
| 2005/0245115 A1 | 11/2005 | Bell et al. |
| 2005/0246421 A1 | 11/2005 | Moore |
| 2006/0005055 A1 | 1/2006 | Potega |
| 2006/0031454 A1 | 2/2006 | Ewing et al. |
| 2006/0061958 A1 | 3/2006 | Solomon et al. |
| 2006/0061961 A1 | 3/2006 | Yin et al. |
| 2006/0075286 A1 | 4/2006 | Hodge et al. |
| 2006/0095641 A1 | 5/2006 | Pandit et al. |
| 2006/0103504 A1 | 5/2006 | Vassallo |
| 2006/0112375 A1 | 5/2006 | Schneider |
| 2006/0123807 A1 | 6/2006 | Sullivan et al. |
| 2006/0161713 A1 | 7/2006 | Belady |
| 2006/0205381 A1 | 9/2006 | Beart et al. |
| 2006/0250764 A1 | 11/2006 | Howarth et al. |
| 2006/0250765 A1 | 11/2006 | Howarth et al. |
| 2006/0250767 A1 | 11/2006 | Brophy et al. |
| 2007/0030276 A1 | 2/2007 | MacInnis et al. |
| 2007/0033289 A1 | 2/2007 | Nuyttens et al. |
| 2007/0054550 A1 | 3/2007 | Cuthbert et al. |
| 2007/0055740 A1 | 3/2007 | Luciani et al. |
| 2007/0058332 A1 | 3/2007 | Canterbury et al. |
| 2007/0065078 A1 | 3/2007 | Jiang |
| 2007/0070598 A1 | 3/2007 | Chuang |
| 2007/0074284 A1 | 3/2007 | Woog |
| 2007/0097618 A1 | 5/2007 | Searby et al. |
| 2007/0101039 A1 | 5/2007 | Rutledge et al. |
| 2007/0120874 A1 | 5/2007 | MacInnis et al. |
| 2007/0130323 A1 | 6/2007 | Landsman et al. |
| 2007/0168593 A1 | 7/2007 | Montag et al. |
| 2008/0036780 A1 | 2/2008 | Liang et al. |
| 2008/0053770 A1 | 3/2008 | Tynyk |
| 2008/0079388 A1 | 4/2008 | Sarnowsky |
| 2008/0100713 A1 | 5/2008 | Liu |
| 2008/0119241 A1 | 5/2008 | Dorogusker et al. |
| 2008/0126594 A1 | 5/2008 | Monks et al. |
| 2008/0194119 A1 | 8/2008 | Mori |
| 2008/0239681 A1 | 10/2008 | Iida |
| 2008/0244026 A1 | 10/2008 | Holt et al. |
| 2008/0313108 A1 | 12/2008 | Carrabis |
| 2009/0058359 A1 | 3/2009 | Fischer et al. |
| 2009/0066704 A1 | 3/2009 | Daniel et al. |
| 2009/0072782 A1 | 3/2009 | Randall |
| 2009/0079264 A1 | 3/2009 | Minami |
| 2009/0079416 A1 | 3/2009 | Vinden et al. |
| 2009/0125743 A1 | 5/2009 | Robertson et al. |
| 2009/0158423 A1 | 6/2009 | Orlassino et al. |
| 2009/0177906 A1 | 7/2009 | Paniagua, Jr. et al. |
| 2009/0228614 A1 | 9/2009 | Hwang |
| 2009/0247006 A1 | 10/2009 | Thompson |
| 2009/0254313 A1 | 10/2009 | Armour et al. |
| 2009/0300174 A1 | 12/2009 | Floris et al. |
| 2009/0302799 A1 | 12/2009 | Marquet et al. |
| 2009/0309748 A1 | 12/2009 | Elgort et al. |
| 2010/0022285 A1 | 1/2010 | Randall et al. |
| 2010/0037283 A1 | 2/2010 | Zhu |
| 2010/0066685 A1 | 3/2010 | Cain et al. |
| 2010/0070217 A1 | 3/2010 | Shimada et al. |
| 2010/0081473 A1 | 4/2010 | Chatterjee et al. |
| 2010/0088140 A1 | 4/2010 | Gil et al. |
| 2010/0102979 A1 | 4/2010 | Huang et al. |
| 2010/0128766 A1 | 5/2010 | Sugita |
| 2010/0138582 A1 | 6/2010 | Bird et al. |
| 2010/0174419 A1 | 7/2010 | Brumfield et al. |
| 2010/0182262 A1 | 7/2010 | Yoshikawa et al. |
| 2010/0188808 A1 | 7/2010 | Howarth et al. |
| 2010/0191487 A1 | 7/2010 | Rada et al. |
| 2010/0251361 A1 | 9/2010 | Collopy et al. |
| 2010/0259213 A1 | 10/2010 | Maharaj |
| 2010/0295384 A1 | 11/2010 | Kobayashi |
| 2010/0302454 A1 | 12/2010 | Epstein et al. |
| 2010/0312938 A1 | 12/2010 | Stampfli |
| 2011/0001486 A1 | 1/2011 | Abouda et al. |
| 2011/0035443 A1 | 2/2011 | Jensen |
| 2011/0058255 A1 | 3/2011 | Weiss |
| 2011/0069445 A1 | 3/2011 | Haren et al. |
| 2011/0085816 A1 | 4/2011 | Kim |
| 2011/0105226 A1 | 5/2011 | Perlman |
| 2011/0145466 A1 | 6/2011 | Supran et al. |
| 2011/0179291 A1 | 7/2011 | Weng et al. |
| 2011/0181238 A1 | 7/2011 | Soar |
| 2011/0182029 A1 | 7/2011 | Wu et al. |
| 2011/0204843 A1 | 8/2011 | Foster |
| 2011/0208980 A1 | 8/2011 | Brooks et al. |
| 2011/0239008 A1 | 9/2011 | Lam et al. |
| 2011/0246679 A1 | 10/2011 | Sretenovic |
| 2011/0266997 A1 | 11/2011 | Krancher et al. |
| 2011/0273632 A1 | 11/2011 | Casey |
| 2011/0292640 A1 | 12/2011 | Clark et al. |
| 2011/0297566 A1 | 12/2011 | Gallagher et al. |
| 2012/0034951 A1 | 2/2012 | Jones et al. |
| 2012/0054400 A1 | 3/2012 | Iverson et al. |
| 2012/0068538 A1 | 3/2012 | Ye et al. |
| 2012/0081087 A1 | 4/2012 | Ching-Wei |
| 2012/0110360 A1 | 5/2012 | Lin et al. |
| 2012/0120581 A1 | 5/2012 | Haren |
| 2012/0155013 A1 | 6/2012 | Huang |
| 2012/0166115 A1 | 6/2012 | Apostolakis |
| 2012/0170212 A1 | 7/2012 | Gallouzi et al. |
| 2012/0188087 A1 | 7/2012 | Wang |
| 2012/0203949 A1 | 8/2012 | Benhard et al. |
| 2012/0229076 A1 | 9/2012 | Zhu et al. |
| 2012/0262117 A1 | 10/2012 | Ferber et al. |
| 2012/0275526 A1 | 11/2012 | Hughes |
| 2012/0278640 A1 | 11/2012 | Caglianone |
| 2012/0314777 A1 | 12/2012 | Zhang et al. |
| 2013/0010418 A1 | 1/2013 | Flynn et al. |
| 2013/0050216 A1 | 2/2013 | Whitby-Strevens et al. |
| 2013/0054348 A1 | 2/2013 | Holsman et al. |
| 2013/0057567 A1 | 3/2013 | Frank et al. |
| 2013/0060662 A1 | 3/2013 | Carlson et al. |
| 2013/0073882 A1 | 3/2013 | Inbaraj et al. |
| 2013/0106979 A1 | 5/2013 | Chang et al. |
| 2013/0115826 A1 | 5/2013 | Sloey et al. |
| 2013/0143521 A1 | 6/2013 | Hernandez et al. |
| 2013/0159756 A1 | 6/2013 | Ellis |
| 2013/0165046 A1 | 6/2013 | Tang et al. |
| 2013/0169069 A1 | 7/2013 | Stone et al. |
| 2013/0205060 A1 | 8/2013 | Benhard et al. |
| 2013/0214931 A1 | 8/2013 | Chia |
| 2013/0257368 A1 | 10/2013 | Lau et al. |
| 2013/0262248 A1 | 10/2013 | Kim et al. |
| 2013/0311801 A1 | 11/2013 | Kong et al. |
| 2013/0326495 A1 | 12/2013 | Reunamaki et al. |
| 2014/0000771 A1 | 1/2014 | Sherman et al. |
| 2014/0028462 A1 | 1/2014 | Lawson |
| 2014/0044281 A1 | 2/2014 | Ganem et al. |
| 2014/0063049 A1 | 3/2014 | Armstrong-Muntner |

(56) References Cited

U.S. PATENT DOCUMENTS

| | | |
|---|---|---|
| 2014/0117780 A1 | 5/2014 | Buchheim et al. |
| 2014/0136749 A1 | 5/2014 | North et al. |
| 2014/0150812 A1 | 6/2014 | Liao |
| 2014/0168884 A1 | 6/2014 | Wylie et al. |
| 2014/0172478 A1 | 6/2014 | Vadasz |
| 2014/0172731 A1 | 6/2014 | Ericksen et al. |
| 2014/0181350 A1 | 6/2014 | Pedro et al. |
| 2014/0208134 A1 | 7/2014 | Waters et al. |
| 2014/0244869 A1 | 8/2014 | Adrian et al. |
| 2014/0274204 A1 | 9/2014 | Williams et al. |
| 2014/0278645 A1 | 9/2014 | Davidson et al. |
| 2014/0301575 A1 | 10/2014 | Holtman et al. |
| 2014/0316584 A1 | 10/2014 | Matsuoka et al. |
| 2014/0342669 A1 | 11/2014 | Zeung et al. |
| 2014/0355200 A1 | 12/2014 | Thiers |
| 2014/0359318 A1 | 12/2014 | Liu et al. |
| 2014/0365396 A1 | 12/2014 | Kumar et al. |
| 2015/0006026 A1 | 1/2015 | Schaffer et al. |
| 2015/0009399 A1 | 1/2015 | Jonsson et al. |
| 2015/0013010 A1 | 1/2015 | Rozenweig |
| 2015/0035939 A1 | 2/2015 | Hillier et al. |
| 2015/0036051 A1 | 2/2015 | Broberg et al. |
| 2015/0043154 A1 | 2/2015 | Feldstein et al. |
| 2015/0046623 A1 | 2/2015 | Ramirez et al. |
| 2015/0059251 A1 | 3/2015 | Rinner et al. |
| 2015/0081381 A1 | 3/2015 | Okoba |
| 2015/0082061 A1 | 3/2015 | Ramirez et al. |
| 2015/0106814 A1 | 4/2015 | Vilke et al. |
| 2015/0169477 A1 | 6/2015 | Beel et al. |
| 2015/0170497 A1 | 6/2015 | Thuersam et al. |
| 2015/0195489 A1 | 7/2015 | Sobti et al. |
| 2015/0236743 A1 | 8/2015 | Kennedy |
| 2015/0237191 A1 | 8/2015 | Moran et al. |
| 2015/0281627 A1* | 10/2015 | Wang ............... H04N 5/45 348/565 |
| 2015/0295440 A1 | 10/2015 | Liao |
| 2015/0333789 A1 | 11/2015 | An |
| 2015/0346792 A1 | 12/2015 | Rathi et al. |
| 2015/0356045 A1 | 12/2015 | Soffer |
| 2015/0370681 A1 | 12/2015 | Tonry et al. |
| 2015/0378420 A1 | 12/2015 | Ippolito et al. |
| 2016/0007083 A1 | 1/2016 | Gurha |
| 2016/0026883 A1 | 1/2016 | Matos |
| 2016/0050375 A1 | 2/2016 | Soffer et al. |
| 2016/0065633 A1 | 3/2016 | Kawakubo |
| 2016/0087670 A1 | 3/2016 | Lee |
| 2016/0091926 A1 | 3/2016 | Saxton |
| 2016/0109864 A1 | 4/2016 | Lonn |
| 2016/0134153 A1 | 5/2016 | Miller et al. |
| 2016/0173678 A1 | 6/2016 | Decamp |
| 2016/0187963 A1 | 6/2016 | Leinonen et al. |
| 2016/0190817 A1 | 6/2016 | Hartelt et al. |
| 2016/0193932 A1 | 7/2016 | Pedram |
| 2016/0195856 A1 | 7/2016 | Spero |
| 2016/0195897 A1 | 7/2016 | Robinson |
| 2016/0227381 A1* | 8/2016 | Bargetzi ............ H04L 12/1827 |
| 2016/0268843 A1 | 9/2016 | Baarman |
| 2016/0285301 A1 | 9/2016 | Kim |
| 2016/0285310 A1 | 9/2016 | Tan et al. |
| 2016/0302320 A1 | 10/2016 | Kim et al. |
| 2016/0306616 A1 | 10/2016 | Tomppo |
| 2016/0308929 A1 | 10/2016 | Fu |
| 2016/0321333 A1 | 11/2016 | Oka |
| 2016/0364224 A1 | 12/2016 | Tuukkanen |
| 2016/0372973 A1 | 12/2016 | Fitzgerald et al. |
| 2017/0016696 A1 | 1/2017 | Koskan et al. |
| 2017/0024197 A1 | 1/2017 | Pantelka et al. |
| 2017/0025889 A1 | 1/2017 | Ormesher et al. |
| 2017/0054734 A1 | 2/2017 | Sigal et al. |
| 2017/0068913 A1 | 3/2017 | Pignataro et al. |
| 2017/0070090 A1 | 3/2017 | Miller |
| 2017/0092229 A1 | 3/2017 | Greenebaum et al. |
| 2017/0099361 A1 | 4/2017 | Digilov et al. |
| 2017/0123456 A1 | 5/2017 | Chung et al. |
| 2017/0140235 A1 | 5/2017 | Yu et al. |
| 2017/0150812 A1 | 6/2017 | Tomomatsu et al. |
| 2017/0170859 A1 | 6/2017 | Noori et al. |
| 2017/0177029 A1 | 6/2017 | Nguyen et al. |
| 2017/0255452 A1 | 9/2017 | Barnes et al. |
| 2017/0262779 A1 | 9/2017 | Remaker |
| 2017/0302099 A1 | 10/2017 | Bolden et al. |
| 2017/0325318 A1 | 11/2017 | Wendt et al. |
| 2017/0336846 A1 | 11/2017 | Shieh et al. |
| 2017/0345290 A1 | 11/2017 | Law et al. |
| 2017/0351638 A1 | 12/2017 | Chen et al. |
| 2017/0374114 A1 | 12/2017 | Feldman |
| 2018/0017992 A1 | 1/2018 | Wylie |
| 2018/0055175 A1 | 3/2018 | Rho et al. |
| 2018/0062417 A1 | 3/2018 | Choi et al. |
| 2018/0067885 A1 | 3/2018 | Hsieh et al. |
| 2018/0103212 A1 | 4/2018 | Epstein et al. |
| 2018/0131148 A1 | 5/2018 | Liu |
| 2018/0143664 A1 | 5/2018 | Wylie |
| 2018/0143665 A1 | 5/2018 | Wylie |
| 2018/0143934 A1 | 5/2018 | Li |
| 2018/0177024 A1 | 6/2018 | Mohan et al. |
| 2018/0189730 A1 | 7/2018 | Wilkinson et al. |
| 2018/0191113 A1 | 7/2018 | Byrne et al. |
| 2018/0198248 A1 | 7/2018 | Sun et al. |
| 2018/0210744 A1 | 7/2018 | Shih et al. |
| 2018/0267681 A1 | 9/2018 | Epstein |
| 2018/0324393 A1 | 11/2018 | Ryan et al. |
| 2018/0338368 A1 | 11/2018 | Pfund et al. |
| 2019/0005476 A1 | 1/2019 | Luo et al. |
| 2019/0018811 A1 | 1/2019 | Hundal et al. |
| 2019/0025353 A1 | 1/2019 | Decamp |
| 2019/0025354 A1 | 1/2019 | Decamp |
| 2019/0025355 A1 | 1/2019 | Decamp |
| 2019/0097962 A1 | 3/2019 | Young et al. |
| 2019/0138737 A1 | 5/2019 | Leipold |
| 2019/0197009 A1 | 6/2019 | Chen et al. |
| 2019/0228348 A1 | 7/2019 | O'Keefe-Sally et al. |
| 2019/0243419 A1 | 8/2019 | Charlesworth et al. |
| 2019/0243637 A1 | 8/2019 | Nachimuthu |
| 2019/0272005 A1 | 9/2019 | Wickett |
| 2019/0272141 A1 | 9/2019 | Poel et al. |
| 2019/0273754 A1 | 9/2019 | Ting |
| 2019/0303342 A1 | 10/2019 | Jen et al. |
| 2019/0354361 A1 | 11/2019 | Gang et al. |
| 2019/0361407 A1 | 11/2019 | Vogel et al. |
| 2019/0389064 A1 | 12/2019 | High et al. |
| 2019/0392356 A1 | 12/2019 | Munir et al. |
| 2020/0042710 A1 | 2/2020 | Liu et al. |
| 2020/0104762 A1 | 4/2020 | Gibson et al. |
| 2020/0133368 A1 | 4/2020 | Volek et al. |
| 2020/0177596 A1 | 6/2020 | Grobelny et al. |
| 2020/0201388 A1 | 6/2020 | Spyrison et al. |
| 2020/0212694 A1 | 7/2020 | Spyrison et al. |
| 2020/0218324 A1 | 7/2020 | Decamp et al. |
| 2020/0218811 A1 | 7/2020 | Rangel-Martinez |
| 2020/0219036 A1 | 7/2020 | Decamp et al. |
| 2020/0241597 A1 | 7/2020 | Decamp et al. |
| 2020/0256902 A1 | 8/2020 | Decamp et al. |
| 2020/0257517 A1 | 8/2020 | Seater et al. |
| 2020/0259805 A1 | 8/2020 | Grobelny et al. |
| 2020/0293634 A1 | 9/2020 | Tsao |
| 2020/0301693 A1 | 9/2020 | Patel et al. |
| 2020/0314744 A1 | 10/2020 | Bhanja et al. |
| 2020/0326955 A1 | 10/2020 | Adiletta et al. |
| 2020/0348724 A1 | 11/2020 | Vroom et al. |
| 2020/0364342 A1 | 11/2020 | Martinez et al. |
| 2020/0388377 A1 | 12/2020 | MacDonald |
| 2021/0034355 A1 | 2/2021 | Montero et al. |
| 2021/0051298 A1 | 2/2021 | Atkins et al. |
| 2021/0058584 A1 | 2/2021 | Decamp et al. |
| 2021/0067365 A1 | 3/2021 | Ansari et al. |
| 2021/0072792 A1 | 3/2021 | Decamp et al. |
| 2021/0073155 A1 | 3/2021 | Decamp et al. |
| 2021/0097565 A1 | 4/2021 | Subbloie et al. |
| 2021/0119930 A1 | 4/2021 | Debbage et al. |
| 2021/0181794 A1 | 6/2021 | Chung et al. |
| 2021/0191462 A1 | 6/2021 | Decamp et al. |
| 2021/0233010 A1 | 7/2021 | Decamp et al. |
| 2021/0258538 A1 | 8/2021 | Decamp, II et al. |

(56) References Cited

U.S. PATENT DOCUMENTS

| | | | |
|---|---|---|---|
| 2021/0286580 A1* | 9/2021 | Tian | G06F 3/03543 |
| 2022/0011382 A1 | 1/2022 | Chiang et al. | |
| 2022/0021227 A1 | 1/2022 | Spyrison et al. | |
| 2022/0210225 A1 | 6/2022 | Shilimkar et al. | |

FOREIGN PATENT DOCUMENTS

| | | | |
|---|---|---|---|
| CN | 104094187 | | 10/2014 |
| CN | 104838558 | | 8/2015 |
| CN | 105593782 | | 5/2016 |
| CN | 205651721 | U | 10/2016 |
| CN | 106707834 | | 5/2017 |
| CN | 107274660 | A | 10/2017 |
| CN | 107702282 | A | 2/2018 |
| DE | 102013104216 | | 11/2013 |
| DE | 202017102528 | U1 | 5/2017 |
| DE | 102016200482 | | 7/2017 |
| EP | 1085400 | A2 | 3/2001 |
| EP | 2645343 | A2 | 10/2013 |
| EP | 2722728 | | 4/2014 |
| EP | 2823372 | | 1/2015 |
| EP | 2929613 | | 10/2015 |
| EP | 3030948 | | 6/2016 |
| EP | 3087476 | | 11/2016 |
| EP | 3226182 | A1 | 10/2017 |
| GB | 2457252 | A | 8/2009 |
| GB | 2513197 | A | 10/2014 |
| IN | 201617004084 | | 12/2015 |
| IN | 201406041 | | 1/2016 |
| JP | 2013239178 | | 11/2013 |
| JP | 6110878 | | 5/2015 |
| JP | 2016504900 | | 2/2016 |
| JP | 2016095633 | A | 5/2016 |
| JP | 2016532928 | A | 10/2016 |
| KR | 1020090069890 | A | 7/2009 |
| KR | 20100000082 | U | 1/2010 |
| KR | 20140069684 | A | 6/2014 |
| KR | 1020140069684 | | 6/2014 |
| KR | 101452319 | | 10/2014 |
| KR | 20150091362 | | 8/2015 |
| KR | 20150130842 | A | 11/2015 |
| KR | 1020150130842 | | 11/2015 |
| KR | 1020160121116 | A | 10/2016 |
| KR | 20170075201 | | 7/2017 |
| KR | 2020100000082 | | 1/2020 |
| RU | 2630376 | | 7/2017 |
| TW | I387182 | B1 | 2/2013 |
| TW | 201347581 | | 11/2013 |
| WO | 03030304 | A2 | 4/2003 |
| WO | 2005003983 | A1 | 1/2005 |
| WO | 2008109193 | A1 | 9/2008 |
| WO | 2011138581 | A2 | 11/2011 |
| WO | 2013024855 | A1 | 2/2013 |
| WO | 2013033573 | A2 | 3/2013 |
| WO | WO-2014172678 | A1 * | 10/2014 ............. H04L 12/18 |
| WO | 2015053976 | A1 | 4/2015 |
| WO | 2016011566 | A1 | 1/2016 |
| WO | 2016040781 | A1 | 3/2016 |
| WO | 2017069490 | A1 | 4/2017 |
| WO | 2017140474 | | 8/2017 |
| WO | 20018216004 | A1 | 11/2018 |
| WO | 2019018007 | | 1/2019 |
| WO | 2019067600 | A1 | 4/2019 |
| WO | 2019072244 | A1 | 4/2019 |
| WO | 2019118130 | A1 | 6/2019 |
| WO | 2019161138 | A1 | 8/2019 |
| WO | 2019173346 | | 9/2019 |
| WO | 2020117834 | A1 | 6/2020 |
| WO | 2020142525 | A1 | 7/2020 |
| WO | 2020172802 | A1 | 9/2020 |
| WO | 2020202181 | A1 | 10/2020 |
| WO | 2020231583 | A1 | 11/2020 |
| WO | 2020231744 | A1 | 11/2020 |
| WO | 2020251546 | A1 | 12/2020 |
| WO | 2021035156 | A1 | 2/2021 |
| WO | 2021050215 | A1 | 3/2021 |
| WO | 2021050575 | A1 | 3/2021 |

OTHER PUBLICATIONS

U.S. Appl. No. 13/365,754, et al., Notice of Allowance ,dated Feb. 4, 2015 ,8 pgs.

U.S. Appl. No. 13/365,754 et al., Final Office Action ,dated Jun. 10, 2014 ,22 pgs.

U.S. Appl. No. 13/365,754, et al., Non-Final Office Action ,dated May 13, 2014 ,18 pgs.

U.S. Appl. No. 13/365,754, et al., Non-Final Office Action ,dated Sep. 10, 2013 ,15 pgs.

U.S. Appl. No. 13/365,754 et al., Non-Final Office Action ,dated Sep. 17, 2014 ,25 pgs.

U.S. Appl. No. 13/786,038 et al., Non-Final Office Action ,dated Sep. 18, 2014 ,24 pgs.

U.S. Appl. No. 14/634,196 et al., Non-Final Office Action ,dated Sep. 7, 2016 ,25 pgs.

U.S. Appl. No. 14/923,833 et al., Final Office Action ,dated Aug. 9, 2017 ,22 pgs.

U.S. Appl. No. 14/923,833, et al., Notice of Allowance ,dated Dec. 18, 2017 ,5 pgs.

U.S. Appl. No. 14/923,833, et al., Non-Final Office Action ,dated Mar. 2, 2017 ,22 pgs.

U.S. Appl. No. 14/923,833, et al., Non-Final Office Action ,dated Nov. 1, 2016 ,14 pgs.

U.S. Appl. No. 14/970,318, et al., Notice of Allowance ,dated Dec. 6, 2017 ,11 pgs.

U.S. Appl. No. 14/970,318, et al., Non-Final Office Action ,dated Feb. 6, 2017 ,21 pgs.

U.S. Appl. No. 14/970,318, et al., Final Office Action ,dated Jul. 11, 2017 ,25 pgs.

U.S. Appl. No. 14/970,318, et al., Non-Final Office Action ,dated Oct. 14, 2016 ,13 pgs.

U.S. Appl. No. 14/970,318, et al., Advisory Action ,dated Sep. 28, 2017 ,3 pgs.

U.S. Appl. No. 15/261,204, et al., Non-Final Office Action ,dated Apr. 30, 2018 ,20 pgs.

U.S. Appl. No. 15/261,204, et al., Advisory Action ,dated Feb. 1, 2019 ,7 pages.

U.S. Appl. No. 15/261,204, et al., Notice of Allowance ,dated Feb. 4, 2020 ,8 pages.

U.S. Appl. No. 15/261,204, et al., Non-Final Office Action ,dated Jun. 27, 2019 ,20 pages.

U.S. Appl. No. 15/261,204, et al., Final Office Action ,dated Nov. 2, 2018 ,22 pgs.

U.S. Appl. No. 15/655,669, et al., Final Office Action ,dated May 16, 2019 ,16 pages.

U.S. Appl. No. 15/655,699, et al., Advisory Action ,dated Aug. 1, 2019 ,4 pages.

U.S. Appl. No. 15/655,699, et al., Final Office Action ,dated Feb. 7, 2020 ,8 pages.

U.S. Appl. No. 15/655,699, et al., Notice of Allowance ,dated Mar. 6, 2020 ,7 pages.

U.S. Appl. No. 15/655,699, et al., Non-Final Office Action ,dated Nov. 19. 2018 ,37 pgs.

U.S. Appl. No. 15/655,699, et al., Non-Final Office Action ,dated Sep. 6, 2019 ,18 pages.

U.S. Appl. No. 15/905,241, et al., Non-Final Office Action ,dated Nov. 2, 2018 ,34 pgs.

U.S. Appl. No. 16/029,339, et al., Final Office Action ,dated Apr. 19, 2019 ,14 pages.

U.S. Appl. No. 16/029,339, et al., Non-Final Office Action ,dated Aug. 8, 2019 ,14 pages.

U.S. Appl. No. 16/029,339, et al., Notice of Allowance ,dated Dec. 4, 2019 ,10 pages.

U.S. Appl. No. 16/029,339, et al., Non-Final Office Action ,dated Nov. 2, 2018 ,28 pgs.

U.S. Appl. No. 16/240,124, et al., Notice of Allowance ,dated Feb. 22, 2021 ,9 pages.

(56) References Cited

OTHER PUBLICATIONS

U.S. Appl. No. 16/240,124, et al., Non-Final Office Action, dated Nov. 13. 2020, 30 pages.
U.S. Appl. No. 16/849,858, et al., Notice of Allowance, dated Jan. 22, 2021, 8 pages.
U.S. Appl. No. 16/849,858, et al., Non-Final Office Action, dated Jun. 26, 2020, 12 pages.
U.S. Appl. No. 16/999,778, et al., Notice of Allowance, dated Mar. 19. 2021, 13 pages.
U.S. Appl. No. 16/999,778, et al., Non-Final Office Action, dated Nov. 13. 2020, 16 pages.
17849313.6, et al., Extended European Search Report, dated Mar. 25, 2020, 8 pages.
Agnihotri, Mohit et al., Topology Formation in Mesh Networks Considering Role Suitability, Workshop on Device Communications for 5G Networks, WD5G, 2016, 7 pages.
Dell, et al., Dell Docking Station WD15 User Guide,, 2015, 31 pages.
Dong, Wei et al., Web-based Building Energy Consumption Monitoring and Conservation Service, 4th International Conference on Mechatronics, Materials, Chemistry and Computer Engineering (ICMMCCE 2015), pp. 3036-3040.
Fink, Thomas et al., Toshiba Dynadock V Review, Laptop Magazine, retrieved from the Internet on Dec. 21, 2013, at <http://www.laptopmag.com/review/accessories/Toshiba-dynadock-v.aspx>, Aug. 9, 2010, pp. 1-2.
Ganesh, et al., Visible Engergy UFO Power Center Smart Power Strip Review, AnandTech, http://www.anandtech.com/show/6413/visible-energy-ufo-power-center-smart-power-stripreview, Oct. 26, 2012.
PCT/US2012/023717, et al., International Search Report and Written Opinion, dated Aug. 30, 2012, 9 pgs.
PCT/US2014/017434, et al., International Search Report and Written Opinion, dated Jun. 30, 2014, 8 pgs.
PCT/US2014/017434, et al., International Preliminary Report on Patentability, dated Sep. 17, 2015, 10 pgs.
PCT/US2015/065730, et al., International Search Report and Written Opinion, dated Apr. 6, 2016, 16 pgs.
PCT/US2017/048367, et al., International Search Report and Written Opinion, dated Oct. 27, 2017, 15 pgs.
Extended European Search Report for European Patent Application No. 19893787.2, dated Jul. 28, 2022, 8 pages.
Extended European Search Report for European Patent Application No. 19900419.3, dated Jul. 29, 2022, 9 pages.
Chau et al., 2015, "STAQ I Modular Powerbank, Wifi Memory, Audio & Dock System", AEGLO, [online], Available from: https://www.kickstarter.com/projects/aeglobrand/worlds-first-modular-phone-dock-power-and-multi-me/description [Accessed Jun. 22, 2022], 22 pages.
GOODBROS., et al., Minimal Size Privacy Protecting WebCam cover "Spyslide" (with English translation), NAVER blog, https://m.post.naver.com/viewer/postView.nhn?volumeNo=7636827&memberNo=36238167&vType=VERTICAL, May 15, 2017, 32 pages.
PCT/US2018/017232, et al., International Search Report and Written Opinion, dated May 21, 2018, 13 pgs.
PCT/US2019/020762, et al., International Search Report and Written Opinion, dated Jun. 13, 2019, 11 pages.
PCT/US2019/064274, et al., International Search Report and Written Opinion, dated Mar. 23, 2020, 10 pages.
PCT/US2019/067581, et al., International Search Report and Written Opinion, dated Apr. 23, 2020, 10 pages.
PCT/US2019/069120, et al., International Search Report and Written Opinion, dated Apr. 29, 2020, 11 pages.
PCT/US2020/046703, et al., International Search Report and Written Opinion, dated Jan. 13, 2021, 12 pages.
PCT/US2020/047448, et al., International Search Report and Written Opinion, dated Nov. 20, 2020, 13 pages.
PCT/US2020/049980, et al., International Search Report and Written Opinion, dated Nov. 27, 2020, 15 pages.
Tech Armor, et al., Tech Armor Macbook Pro Privacy Screen Protector, Privacy Apple MacBook Pro Retina, https://www.amazon.com/Macbook-Privacy-Protector-Tech-Armor/dp/B01MZ1W2Y2, Dec. 20, 2016, 9 pages.
VMEI, et al., Echo Show Screen Protecto, https://www.amazon.com/Protector-Important-Everyones-Safe-Designed-VMEI/dp/B075W6Y— Retrieved Jul. 30, 2019, 2017.
Wikipedia, et al., USB, https://web.archive.org/web/20141024053934/https://en.wikipedia.org/wiki/USB, Oct. 24, 2014, 42 pages.

\* cited by examiner

SYSTEMS AND METHODS FOR PARTICIPANT-CONTROLLED VIDEO CONFERENCING

RELATED APPLICATIONS

This application is a continuation of U.S. patent application Ser. No. 17/308,351, filed on May 5, 2021 and titled "SYSTEMS AND METHODS FOR PARTICIPANT-CONTROLLED VIDEO CONFERENCING" which claims priority to U.S. patent application Ser. No. 16/999,778, filed on Aug. 21, 2020 and titled "SYSTEMS AND METHODS FOR PARTICIPANT-CONTROLLED VIDEO CONFERENCING" which claims priority to U.S. Patent Application No. 62/890,482 filed on Aug. 22, 2019 and titled "SYSTEMS AND METHODS FOR PARTICIPANT-CONTROLLED VIDEO CONFERENCING" all of which are incorporated by reference in their entirety.

TECHNICAL FIELD

This disclosure generally relates to the field of video conferencing. More specifically, this disclosure relates to the field of video conferencing using USB equipped devices.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Modern collaborative workspaces (conference rooms, huddle spaces, classrooms, etc.) are plagued by ineffective, messy, and confusing video conferencing, power, and connectivity solutions. Although many technology providers offer integrated solutions for video conferencing that include full NV connectivity to a projector, TV, or display, they all suffer from an inability to connect the devices of multiple conference participants at the same time and further fail to provide simple functionality to swap presenters easily.

The present disclosure relates to a conferencing device that solves these (and other) issues. The conferencing device of the present disclosure may leverage, among other possible choices, Universal Serial Bus (USB) compliant hardware and cabling in order to facilitate communication with an external host device (e.g., a device that is presently using, or may in the future use, the conferencing device to present a presentation to a group). A USB cable between a conferencing device of the present disclosure and an external host device may provide data transfer between the devices, power transfer between the devices, or both. While all types of USB are contemplated as possibilities for performing either or both of these power transfer and data transfer functions, it is noted that given the rise of USB Type-C (USB-C) devices, providing device charging and presentation data connectivity simultaneously via a USB-C cable is becoming increasingly relevant.

Figure 1:
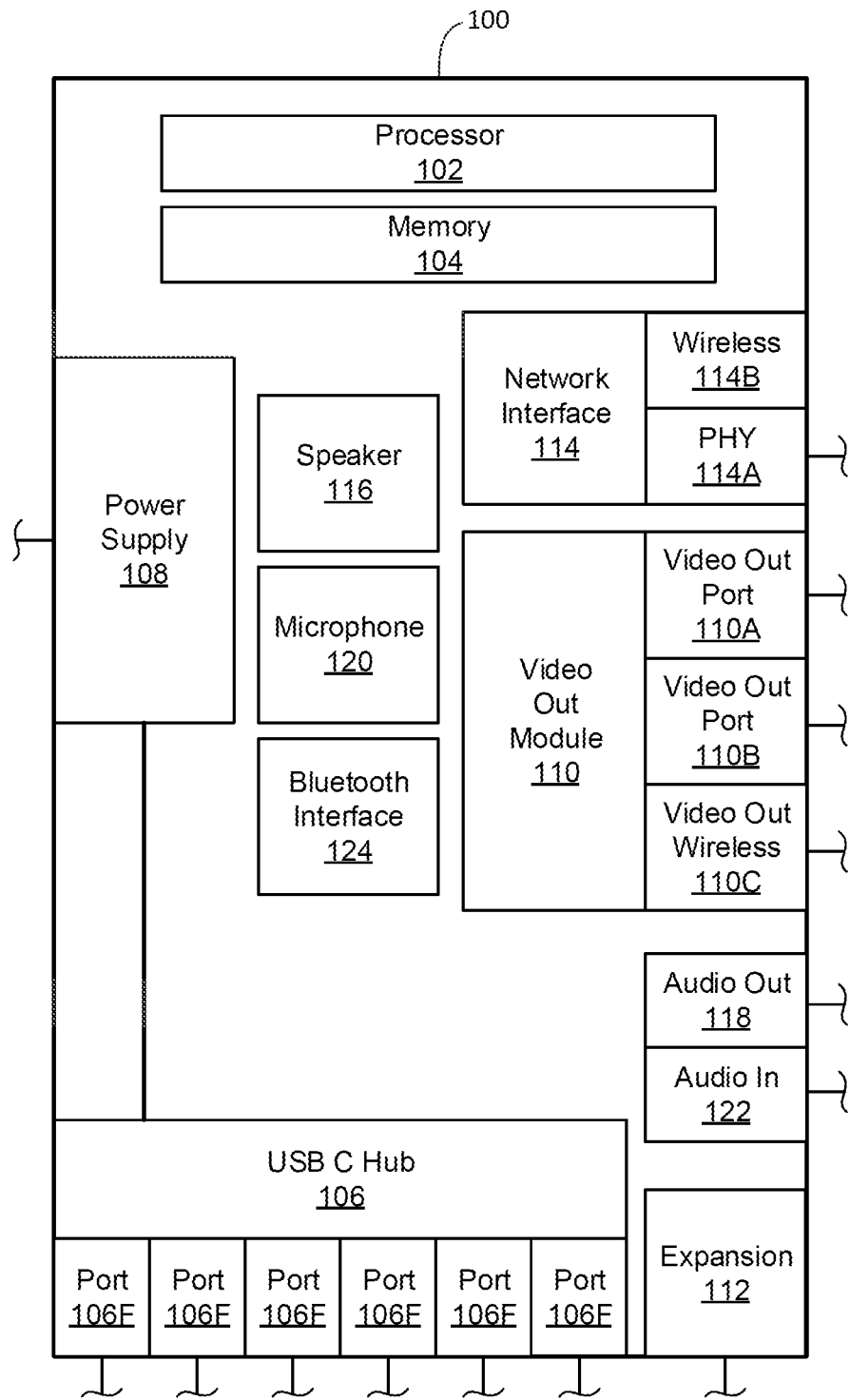
FIG. 1 illustrates a conferencing device, according to one embodiment.

FIG. 1 illustrates an embodiment of a conferencing device 100 which includes a processor 102 and a memory 104. The processor 102 may be in electrical communication with the memory 104 such that information may be stored and retrieved by the processor 102 to and from the memory 104. The processor 102 may be in electrical control and communication with any of the other elements 104-124 of the conferencing device 100, enabling it to send data to and/or receive data from each respective element 104-124.

The conferencing device 100 may include a USB hub 106. The USB hub 106 may be, e.g., a USB-C hub, another type of USB hub, or a hub of hybrid USB type. The USB hub 106 may further include USB ports 106A-F. The USB ports 106A-F may each respectively be USB-C ports or ports of another USB type. Each of the USB ports 106A-F may include a physical USB interface that allows an external host device, also referenced herein as a portable electronic device, to be placed in electrical communication with a USB port 106A-F to communicate with the USB hub 106. For example, the USB port 106A-F may communicate with an external host device/portable electronic device using a USB cable that is attached to the respective USB ports 106A-F via the physical USB interface. In alternative embodiments, the USB interface may itself comprise a USB cable (which is not removable from the USB hub), which may then electrically communicate with an external host device.

The USB hub 106 may allow for data transmission to and from any external host device in electrical communication with the USB port 106A-F and the processor 102. Among other things, the USB hub 106 may receive video data and/or control signals provided by an external host device and further transport the control signals and/or video data to the processor 102. The USB hub 106 may also allow for data transmission between any external host device in communication with a USB port 106A-F and any other device in communication with another USB port 106A-F.

The conferencing device 100 further includes a power supply 108. The power supply 108 may provide power to any or all of the other elements 102-124 of the conferencing device 100. In one embodiment, the power supply 108 may be in electrical communication with the USB hub 106 in order to provide the USB hub 106 with power that the USB hub 106 may then pass along to any external host device in communication with any of the USB ports 106A-F. The USB hub 106 may provide power to one or more external host devices at the same time that the USB hub 106 provides the data communication features described herein to those one or more external host devices.

The conferencing device 100 further includes a video out module 110 that includes one or more video out ports 110A, 110B and video out wireless interface 110C. The video out module 110 may be capable of receiving video data from the processor 102 and displaying it on one or more of the video out ports 110A, 110B and video out wireless interface 110C. The video data may be provided to the processor 102 by one or more external host devices in communication with the USB hub 106.

The video out ports 110A, 110B may be of different types. For example, it may be that video out port 110A is of a High Definition Media Interface (HDMI) type while video out port 110B is of a DisplayPort type. Other types of video out port include Digital Video Interface (DVI), Video Graphics Array (VGA), an RCA video out port, or any other port configured to transport video data provided by the processor 102. One or more video out ports 110A, 110B may also be capable of transporting audio data over an interface that also handles audio data (e.g., via an HDMI interface). In FIG. 1, the video out module 110 is illustrated as having two video out ports 110A, 110B and a video out wireless interface 110C. However, one of skill in the art will appreciate that other embodiments may include one, three, four, or any other number of video out ports or wireless interfaces.

The conferencing device 100 may further include an expansion port 112. The expansion port 112 may be configured such that a second conferencing device may be connected to the expansion port 112 of the conferencing device 100. As further described below, when the conferencing device 100 is connected to a second conferencing device, the two conferencing devices may act together as a single logical conferencing device that can support more connected external host devices than can be supported by one conferencing device alone. The expansion port 112 may include a USB interface for connection to a second conferencing device. The expansion port 112 may be a separate port from the USB hub 106, as illustrated in FIG. 1. Alternatively, any of the USB ports 106A-F on the USB hub 106 may be able to act as an expansion port when connected to either the expansion port or an analogous USB hub port of a second conferencing device.

The conferencing device 100 may further include a network interface 114, which may include either or both of a physical interface 114A (e.g., an Ethernet interface) and/or a wireless interface 114B (e.g., an 802.11 wireless transceiver) to communicate with other devices on a computer network. A network connection established with the network interface 114 may allow the conferencing device 100 to connect to and coordinate with other devices, including remote conferencing devices. In this way, the conferencing device 100 may be able to pass data to remote conferencing devices that are not directly connected to the conferencing device 100. This data may include video data, audio data, and/or control signals from one or more of the external host devices that are connected to the USB hub 106 of the conferencing device 100. In this way, one or more remote conferencing devices that are not physically attached to the conferencing device 100 may be able to participate in the same conference as the conferencing device 100. In some embodiments, an external host device may communicate with the conferencing device 100 over the network interface 114 instead of over a connection to the USB hub 106, even in cases when the external host device is not remote to the conferencing device 100.

The conferencing device 100 may use speakers to reproduce audio associated with the presentation (e.g., the voice of a presenter or other participant in the video conference). The conferencing device 100 may use one or more of a built-in speaker 116, a speaker attached to an audio out port 118, and/or a speaker connected to a Bluetooth interface 124 for this purpose.

The conferencing device 100 may also use microphones to capture audio associated with the presentation (e.g., the voice of a presenter or other participant in the video conference). The conferencing device 100 may use one or more of a built-in microphone 120, a microphone attached to an audio in port 122, and/or a microphone attached to the Bluetooth interface 124 for this purpose.

Figure 2:
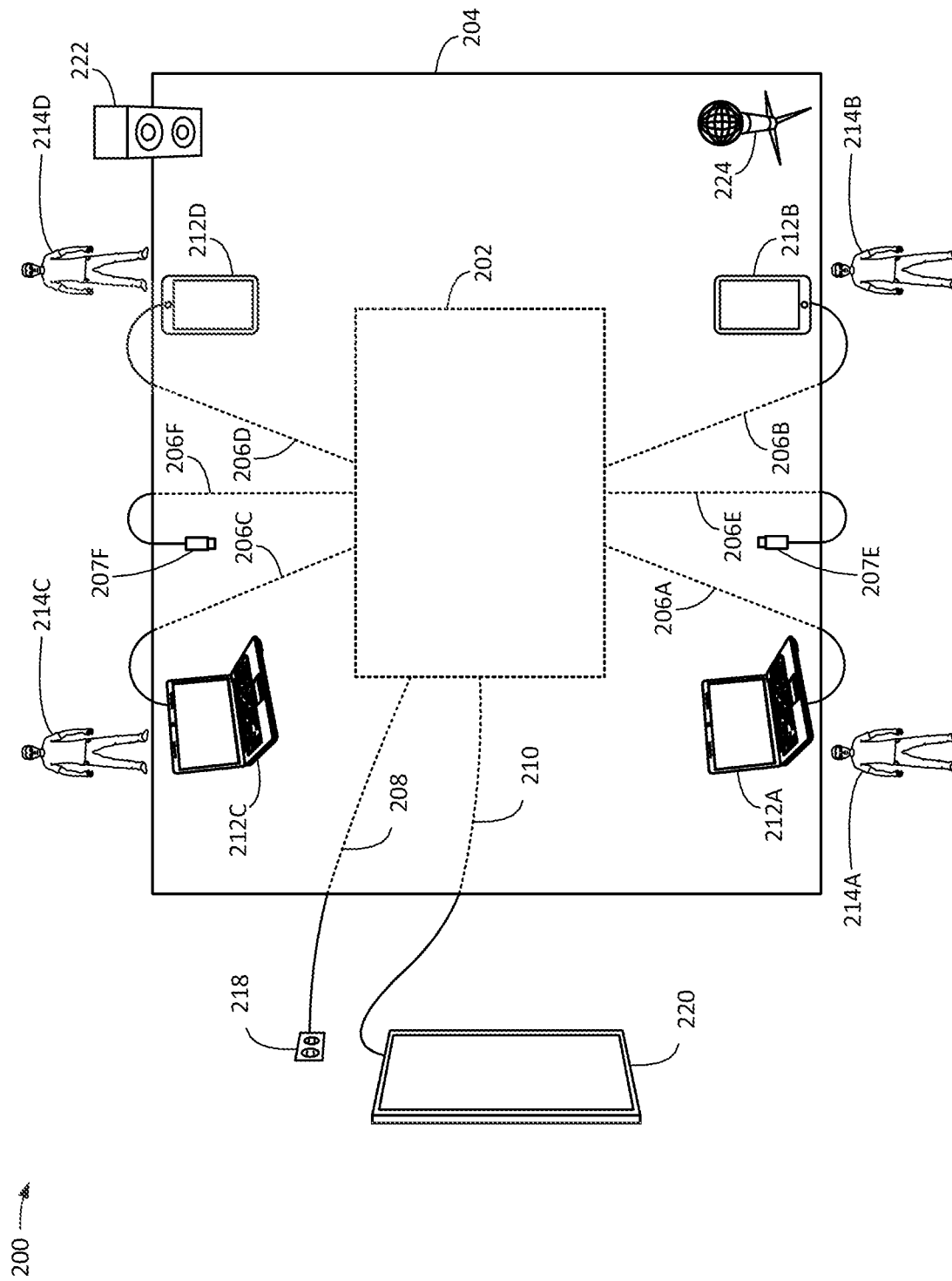
FIG. 2 illustrates a system including a conferencing device in a conference room setting, according to an embodiment.

FIG. 2 illustrates a conferencing system 200 of a conferencing device in a conference room setting, according to an embodiment. The system 200 includes a conferencing device 202, which may be similar to the conferencing device 100 of FIG. 1, in use with a conference table 204. In the embodiment of FIG. 2, the conferencing device 202 is shown in dotted lines to represent that the unit has been integrated into (or installed underneath) the conference table 204 rather than simply placed on top of the conference table 204. Each of the USB cables 206A-F may be coupled to a USB hub of the conferencing device 202. The USB cables 206A-F may each respectively be a USB-C cable, or alternatively may be a cable of another USB type. Hybrid cables (e.g., where one end is, e.g., USB-C and a second end is, e.g., USB-A) are also contemplated, which may allow for functionality between a port of a USB hub of the conferencing device 202 that is of one type of USB and an external host device with a USB interface of a different type of USB.

Each USB cable 206A-F may have a connector to couple to a corresponding device to allow power/data communication. In FIG. 2, connectors 207E-F are illustrated and, although connectors corresponding to cables 206A-D are not shown, connectors for cables 206A-D would also be included to enable interfacing with corresponding devices. The connectors 207E-F may include any structure and adapters well known in the art to enable an interface with devices for power/data communication.

A power cable 208 may be in electrical communication with a power supply of the conferencing device 202. The system 200 may include a video cable 210 in electrical communication with a video out module of the conferencing device 202. Similar to the conferencing device 202, the portions of these cables that are adjacent to the surface of the conference table 204 have been shown in dotted lines to represent that those portions of each of these cables are integrated into (or installed underneath) the conference table 204 rather than simply placed on top of the conference table 204. The integration (or underneath installation) of the conferencing device 202 and/or the USB cables 206A-D may reduce clutter on the surface of the conference table 204.

In some embodiments, the portion of each USB cable 206A-F, the power cable 208, and/or the video cable 210 that is not integrated into (or installed underneath) the conference table 204 may be removably attached to and from the integrated (or underneath) portion of such cable at a location at or near where the cable presents through or away from the conference table 204. Removing the portion of each such cable that is not integrated into (or underneath) the conference table 204 when that cable is not being used may help reduce unnecessary clutter. This optional removability may be accomplished via, e.g., a USB socket on the end of the integrated portion of each USB cable 206A-F at or near the location it presents through or away from the conference table 204 and a USB plug on the end of the unintegrated portion of each USB cable 206A-F that attaches to the socket of the integrated portion of the USB cable 206A-F. Similar strategies can be taken using sockets and plugs compatible with the other cables that may be used by the conferencing device 202 (e.g., the video cable 210, the power cable 208, any audio cables, any networking cables, etc.).

The sockets and/or plugs corresponding to one or more USB cables 206A-F may each respectively be USB-C type sockets and/or plugs, or alternatively they may each respectively be sockets/plugs of another USB type. The USB type of the socket of the integrated portion of a USB cable 206A-F does not need to match the USB type of the port of the USB hub of a conferencing device 202 to which the other end of the integrated portion of the USB cable 206A-F is attached. Further, the unintegrated portion of the USB cable 206A-F may have differently typed USB plugs/connectors on each end in order to permit compatibility between, e.g., a socket of an integrated portion of the USB cable 206A-F that is of one type and an interface on an external host device that is of another USB type.

The USB cables 206A-D are illustrated coupled to a corresponding external host device/portable electronic devices 212A-D associated with a meeting participant 214A-D. The external host devices 212A-D may be embodied as a laptop, smartphone, tablet, or another type of device that includes a USB interface for communicating with the USB cables 206A-F. A USB interface on an external host device may be a USB-C type interface, or alternatively may be an interface of another USB type. In the embodiment of FIG. 2, the USB cables 206E-F are not shown connected to an external host device. As previously stated, each USB cable 206A-F has a corresponding connector, such as connectors 207E-F, to enable coupling with a USB interface.

The power cable 208 may be attached to a wall outlet 218 or other source of power in order to provide power to the power supply of the conferencing device 202. Power received at the power supply in this way may then be provided to the USB hub of the conferencing device 202. Some of this power may then be transported from the USB hub to one or more of the external host devices 212A-D via the USB cables 206A-D.

The video cable 210 may be attached to a presentation device 220 and may transport video data from a video out port of the conferencing device 202 to the presentation device 220, which may be placed in a manner that each participant 214A-D may comfortably and easily view the video data on the presentation device 220. Optionally, the video cable 210 may also transport audio data associated with the video data, which may also be reproduced (in some cases) by the presentation device 220 (e.g., should the presentation device 220 have built-in speakers). While the presentation device 220 has been illustrated in FIG. 2 (and other figures throughout) as a device containing a display panel, other types of presentation devices are also contemplated (e.g., a projector type presentation device).

Alternatively, the conferencing device 202 may transport such video and/or audio data to the presentation device 220 via another cable, such as a USB cable attached to a USB port of a USB hub of the conferencing device 202, or via a network cable attached to a physical network interface of the conferencing device 202. As a further alternative, the conferencing device 202 may transport such video and/or audio data to the presentation device 220 wirelessly via, e.g., a wireless network interface or a Bluetooth interface of the conferencing device 202.

The conferencing device 202 may be connected to a speaker 222 via a Bluetooth connection. This may allow the speaker 222 to reproduce audio associated with the presentation (e.g., the voice of a presenter or other participant in the video conference). This may be especially useful in the case where a presenter or other participant who is currently speaking is at a location other than the location of the conferencing device 202, and where the audio associated with the presentation is arriving to the conferencing device 202 via a network interface (as discussed in relation to FIG. 1). In alternative embodiments, the speaker 222 may be connected to the conferencing device 202 via a cable attached to an audio out port of the conferencing device 202. In these cases, the audio out cable may be integrated into (or installed under) the conference table 204 similarly to other cables already herein described.

The conferencing device 202 may be in electrical communication with a microphone 224 via a Bluetooth connection. This may allow the microphone 224 to capture audio associated with the presentation (e.g., the voice of a presenter or other participant in the video conference). This may be especially useful where a presenter or other participant who is currently speaking should be heard at a location other than the location of the conferencing device 202, and where the audio associated with the presentation is sent to a remote conferencing device via a network interface of the conferencing device 202 (as discussed in relation to FIG. 1). In alternative embodiments, the microphone 224 may be in electrical communication with the conferencing device 202 via a cable attached to an audio in port of the conferencing device 202. In these cases, the audio in cable may be integrated into (or installed under) the conference table 204 similarly to other cables already herein described.

Software may be installed on each of the external host devices 212A-D to enable the devices to send video data and/or control signals to the conferencing device 202 when connected. The function of this software will now be described in terms of one external host device 212A as it is operated by one of the participants 214A-D. However, it should be understood that each of the external host devices 212A-D as operated by the participants 214A-D (or another connected external host device operated by another participant) may have the same features.

The participant 214A may use the software on the external host device 212A to control the sending of this video data and/or control signals to the conferencing device 202. Specifically, it may be that the participant 214A may use the software on the external host device 212A to instruct the external host device 212A to send a control signal to the conferencing device 202 to instruct the conferencing device 202 to begin receiving video data from the external host device 212A. In response to the receipt of this control signal, the conferencing device 202 may enter a state where it is ready to receive video data from the external host device 212A. Once this control signal has been sent, the external host device 212A may begin sending video data to the conferencing device 202. The video data may be a representation or mirror of the content that is on the screen of the external host device 212A. This video data may be received at the USB hub of the conferencing device 202 and from there transported to the processor of the conferencing device 202. The processor of the conferencing device 202 may then place that video data at a video data output of the conferencing device 202 for transport to the presentation device 220.

That the video data may be a representation or mirror of the content that is on the screen of the external host device 212A makes presentation using the presentation device 220 a simple matter for the participant 214A, who merely must use the external host device 212A in a regular fashion to present their content on the screen of the external host device 212A in order to have it appear on the presentation device 220.

The video data from the external host device 212A may continue to be transported to the presentation device 220 for display until such a time as the participant 214A uses the software on the external host device 212A to instruct the external host device 212A to stop sending video data and/or to send the conferencing device 202 a control signal instructing it to stop using video data from the external host device 212A. Alternatively, the video data from the external host device 212A may continue to be transported to the presentation device 220 for display until such a time as one of the participants 214B-D uses the interface on one of the external host devices 212B-D to send the conferencing device 202 a control signal instructing it to use video data from their respective external host device 212B-D instead of the video data received from the external host device 212A.

It is contemplated that, at times, more than one of the external host devices 212A-D (or another external host device) may provide video data to the conferencing device 202 for display to the presentation device 220. The processor of the conferencing device 202 may be configured to combine the video data from two or more external host devices into combined video data before placing the combined video data at a video out module for transmission to the presentation device 220. The conferencing device 202 may adapt in real time by dividing the screen of the presentation device 220 to provide screen space to each (or at least a multiplicity) of the external host devices that is connected to the conferencing device 202 and that has sent a control signal to the conferencing device 202 to instruct the conferencing device 202 to receive video data from that respective external host device for display on the presentation device 220. The conferencing device 202 may further adapt by consolidating screen space on the presentation device 220 for use by any remaining active video data connections when one or more external host devices cease providing video data to the conferencing device 202 for transmission to the presentation device 220.

As will be discussed in further detail below, it is contemplated that in some embodiments, more than one presentation device may be attached to the one or more video out ports or video out wireless interface of the conferencing device 202. In these cases, the video data presentation, screen splitting, and screen consolidation methods discussed herein may be spread across all of the connected presentation devices by the conferencing device 202.

In embodiments where one or more remote conferencing devices are being used (in addition to the conferencing device 202) to facilitate a presentation to participants at two or more locations, all video and control signals discussed herein may be passed between the conferencing device 202 and the one or more remote conferencing devices via the network interface of the conferencing device 202. Each of the conferencing device 202 and the one or more remote conferencing devices may respond to any control signal or video data from the external host devices 212A-D (or any external host device connected to a remote conferencing device) in the manner described above. Further, any audio captured by a microphone of any conferencing device may be transported and reproduced on a speaker of any conferencing device that is remote to the conferencing device where the audio was captured.

The embodiment of FIG. 2 has discussed a system that provides a USB cable (e.g., the USB cable 206A-F) to each of one or more devices 212A-D for the participants 214A-D using USB cables integrated into (or installed underneath) the conference table 204. It is contemplated that similar cable provisioning to one or more participants could occur using different types of cables other than USB cables, e.g., power cables, audio cables, network cables, and the like. It is contemplated that these cables may be attached (either directly or indirectly) to an appropriate device (e.g., the conferencing device 202, the presentation device 220, the outlet 218, a network switch, etc.) to provide the power and/or data delivery that is normally associated with the given type of cable. The provisioning of one or more of these different types of cables in this way could be in addition to, or separately from, the provisioning of the USB cable to one or more participants as herein described.

Figure 3:
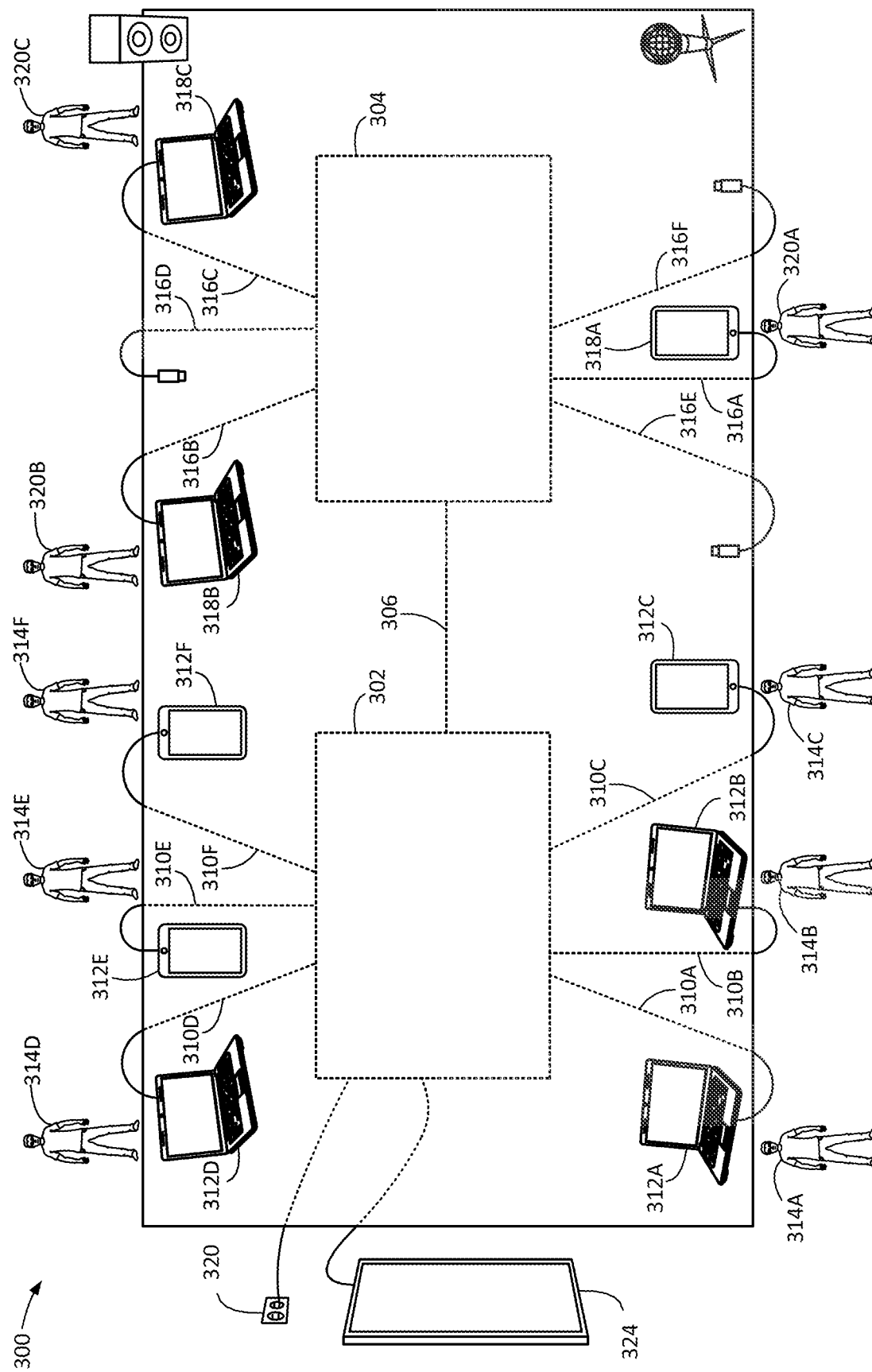
FIG. 3 illustrates a system of directly connected conferencing devices in a conference room setting, according to an embodiment.

FIG. 3 illustrates a system 300 of directly connected conferencing devices in a conference room setting, according to an embodiment. The system 300 includes a first conferencing device 302 and a second conferencing device 304 connected and in electrical communication with each other via a cable 306. The conferencing devices 302, 304 may be embodied similarly to that of FIG. 1. USB cables 310A-F are in electrical communication with a USB hub of the first conferencing device 302. The USB cables 310A-F are in electrical communication at the other end, through use of suitable connectors, to external host devices 312A-F. Each external host device 312A-F has a corresponding participant 314A-F. USB cables 316A-F are in electrical communication with a USB hub of the second conferencing device 304. The USB cables 316A-C are in electrical communication at the other end, through use of suitable connectors, to external host devices 318A-C. The external host devices 318A-C each have a corresponding participant 320A-C. The USB cables 316D-F are not in electrical communication with external host devices and remain unused.

The first conferencing device 302 draws power from a wall outlet 321 via a power cable 322. The first conferencing device 302 is also in electrical communication with a presentation device 324 via a video cable 326. Similarly to the embodiment of FIG. 2, dotted lines represent elements (or portions of elements) that are integrated into (or installed underneath) a conference table 328. As described in relation to FIG. 2, the portion of each USB cable 310A-F, 316A-F (or any other cable, such as the power cable 322 and/or the video cable 326) that is not integrated into (or installed underneath) the conference table 328 may be removably attached to the integrated (or underneath) portion of such cable at a location at or near where the cable presents through or away from the conference table 328.

The connection of the first conferencing device 302 to the second conferencing device 304 via the cable 306 may be between an expansion port on each of the conferencing devices 302, 304. Alternatively, the connection may be made between ports on the USB hub on each of the conferencing devices 302, 304 or between an expansion port on one of the conferencing devices 302, 304 and a port on the USB hub on the other of the conferencing devices 302, 304. However made, the connection via the cable 306 may allow the conferencing devices 302, 304 to act in concert as a single logical conferencing device that can handle more external host devices than may be possible using only a single physical conferencing device.

As shown in FIG. 3, the presentation device 324 may be physically connected to the first conferencing device 302. The first conferencing device 302 may be able to display video data from one or more of the communicating external host devices 312A-F to the presentation device 324 in the manner described above in relation to FIG. 2. The second conferencing device 304 may be capable of receiving control signals and/or video data from any of the external host devices 318A-C that are in electrical communication with the second conferencing device 304. The second conferencing device 304 may further transport control signals and/or video data from the second conferencing device 304 to the first conferencing device 302 via the cable 306. The first conferencing device 302 may treat any control signals and/or video data arriving from the second conferencing device 304 on the cable 306 just as it would treat any control signals and/or video data arriving on one of the USB cables 310A-F from a respective external host device 312A-F. In this manner, the external host devices 318A-C can instruct the first conferencing device 302 to begin receiving video data from an external host device 318A-C, and subsequently have that received video data placed at a video out port of the first conferencing device 302 for transport to the presentation device 324 just as if such an external host device 318A-C were in direct electrical communication with the first conferencing device 302.

In some embodiments, the power supply of the first conferencing device 302 may send power over the cable 306 (or another cable like it) to power the second conferencing device 304 and also to power the USB hub of the second conferencing device 304 to in turn provide power to the external host devices 318A-C. In other embodiments (not shown), a power supply of the second conferencing device 304 is connected to an external power source to provide power to the second conferencing device 304 and to act as a power source from which the USB hub of the second conferencing device 304 can draw to provide power to the external host devices 318A-C.

In embodiments where one or more remote conferencing devices are used (in addition to the first conferencing device 302 and the second conferencing device 304) to facilitate a presentation to participants at two or more locations, all video data and/or control signals discussed herein may be passed between the first conferencing device 302 and/or the second conferencing device 304 and the one or more remote conferencing devices via the network interface(s) of the conferencing device(s) 302, 304. Each of the conferencing devices 302, 304 and the one or more remote conferencing devices may respond to any control signal and/or video data from the external host devices 312A-D or 318A-C (or any external host device connected to a remote conferencing device) in the manner described above. Further, any audio captured by a microphone attached to any conferencing device may be transported to and reproduced on a speaker attached to any conferencing device that is remote to the conferencing device where the audio was captured. Similarly to the first conferencing device 302 and the second conferencing device 304, any remote conferencing device may be acting in concert with another remote conferencing device via a physical connection to act as a single logical conferencing device.

Similarly to embodiments described in relation to FIG. 2, it is contemplated that in addition to (or separately from) providing USB cables (e.g., the USB cables 310A-F, 316A-F) to one or more participants (e.g., the participants 314A-F, 320A-C) in the manner described, cable provisioning to one or more devices could also occur with different types of cables, e.g., power cables, audio cables, network cables, and the like. It is contemplated that these cables may be attached (either directly or indirectly) to an appropriate device (e.g., one or more of the conferencing devices 302, 304, the presentation device 324, the outlet 321, a network switch, etc.) to provide the power and/or data delivery that is normally associated with the given type of cable. The conferencing devices 302, 304 may be configured to pass power/data used by these cables between them using one or more cables positioned similarly to the cable 306.

Figure 4:
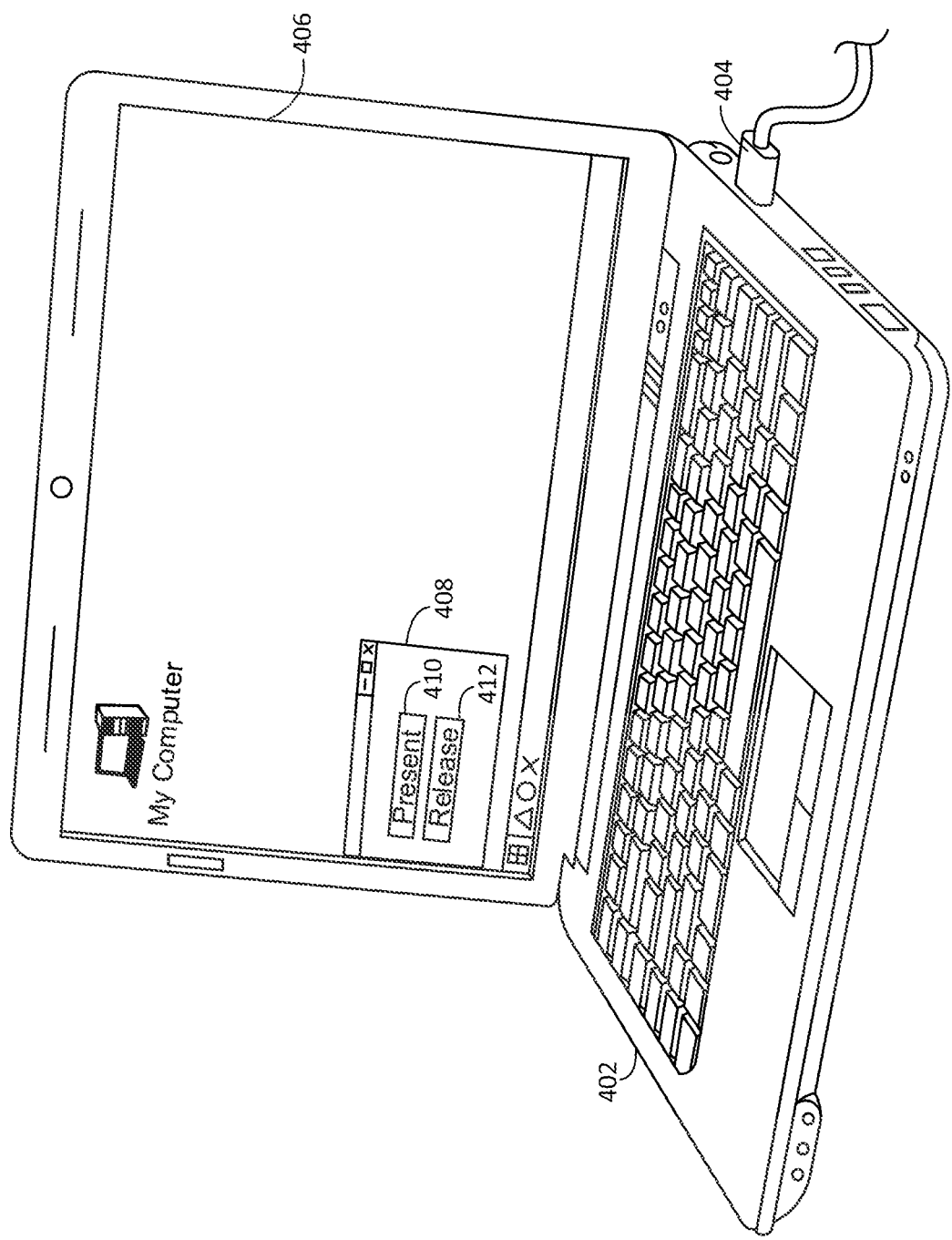
FIG. 4 illustrates a computer connected to a conferencing device via a USB cable and running software configured to send control signals and/or video data to the conferencing device, the software presenting control signal actuators, according to an embodiment.

FIG. 4 illustrates a computer 402 connected to a conferencing device via a USB cable 404 and running software configured to send control signals and/or video data to the conferencing device, the software presenting control signal actuators, according to an embodiment. The software may have been installed by a participant prior to connecting the computer 402 to the conferencing device. Alternatively, the conferencing device may be configured to detect whether a computer 402 that is connected already has the software necessary to control the conferencing device. If the necessary software is not detected when a computer 402 is connected, the software may be provided to the computer 402 via the USB cable 404. In other cases, a link to an online location of the necessary software may be provided to the computer 402 via the USB cable 404. Alternatively, the software may be downloaded to the computer 402 through wireless communication between the conferencing device and the computer 402.

Once the computer 402 has been connected to the conferencing device and the software is installed, the software may run (either automatically upon connection to the conferencing device or manually by the participant after the connection has been made). The computer 402 receives power from the conferencing device and also sends video data to the conferencing device. In the case of the computer 402, the software may cause a screen 406 of the computer 402 to present a dialog box 408. The dialog box 408 may present a control signal actuator to the participant that, when activated by the participant using the computer 402, instructs the computer 402 to send a control signal to the conferencing device that instructs the conferencing device to begin receiving video data from the computer 402. In the embodiment of FIG. 4, this may be a "Present" button 410 that, when pressed by the participant, instructs the computer 402 to send such a control signal. Once this control signal is sent by the computer 402, the conferencing device may enter a state where it is ready to receive video data from the computer 402 and the computer 402 may begin sending video data to the conferencing device. This video data may be a representation or mirror of the video data that is being displayed in all or part of the screen 406 of the computer 402. The participant may then proceed to present their content on a presentation device connected to the conferencing device simply by presenting their content on the screen 406 of the computer 402 in the manner that they normally do so.

The dialog box 408 may further present a control signal actuator to the participant that, when activated by the participant using the computer 402, instructs the computer 402 to send a control signal to the conferencing device that instructs the conferencing device to stop receiving video data from the computer 402. In the embodiment of FIG. 4, this may be a "Release" button 412 that, when pressed by the participant, instructs the computer 402 to send such a control signal. Once this control signal is received by the conferencing device it may stop placing any video data from the computer 402 at a video out port for transport to a presentation device. Further, the computer 402 may stop sending video data to the conferencing device. Closing the software associated with the conferencing device may have the same effect as operating this control signal actuator.

Figure 5A:
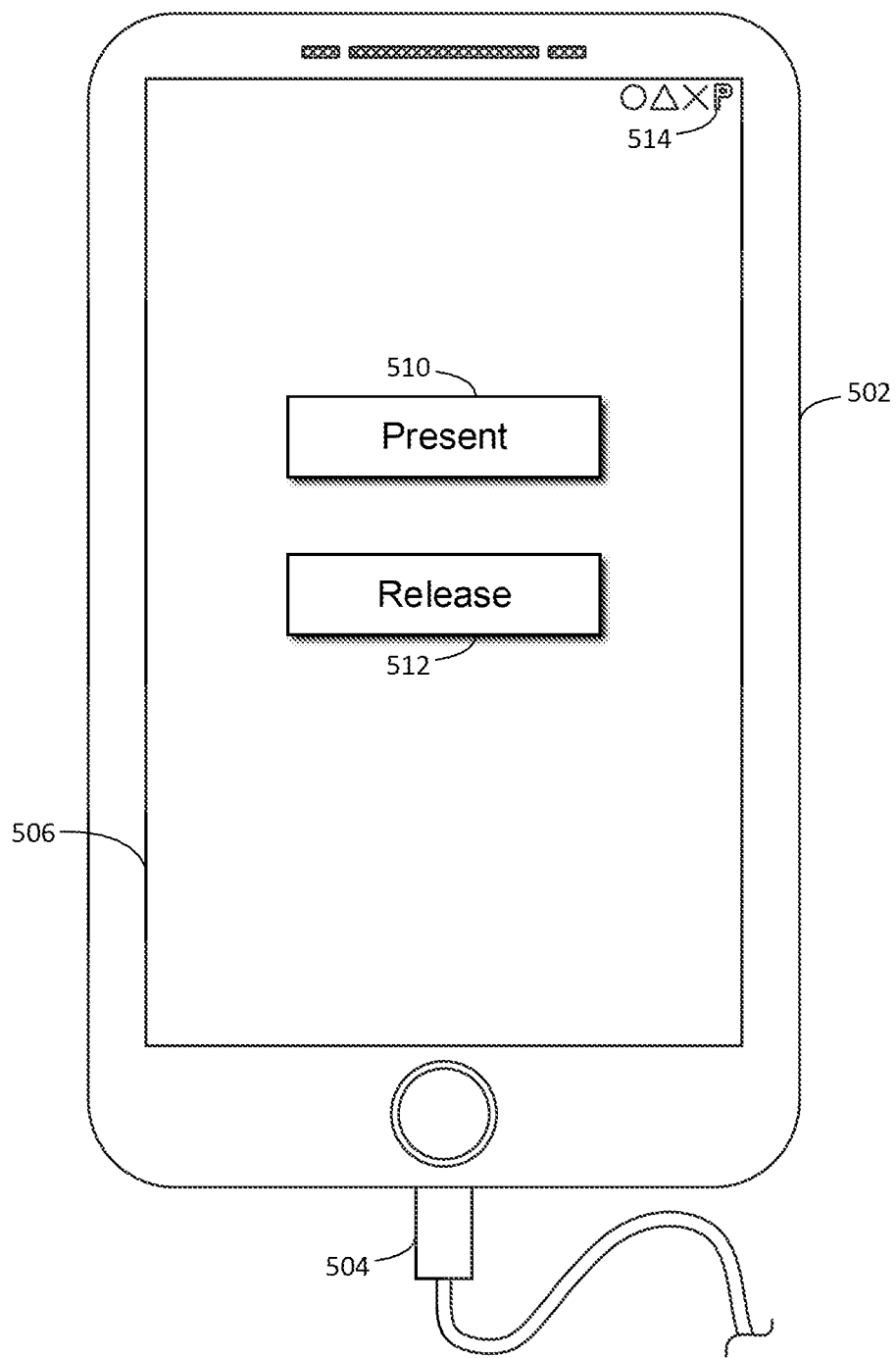
FIG. 5A illustrates a smartphone connected to a conferencing device via a USB cable and running software configured to send control signals and/or video data to the conferencing device, the software presenting control signal actuators, according to an embodiment.

FIG. 5A illustrates 500 a smartphone 502 connected to and in electrical communication with a conferencing device via a USB cable 504. The smartphone 502 receives power from a conferencing device and also sends video data to the conferencing device. The smartphone runs software configured to send control signals and/or video data to the conferencing device, according to an embodiment. The software may have been installed by a participant prior to connecting the smartphone 502 to the conferencing device. Alternatively, the conferencing device may be configured to detect whether a smartphone 502 that is connected already has the software necessary to control the conferencing device. If the necessary software is not detected when a smartphone 502 is connected, the software may be provided to the smartphone 502 via the USB cable 504. In other cases, a link to an online location of the necessary software may be provided to the smartphone 502 via the USB cable 504. Alternatively, the software may be downloaded to the smartphone 502 through wireless communication between the conferencing device and the smartphone 502.

Once the smartphone 502 has been connected to the conferencing device and the software is installed, the software may run (either automatically upon connection to the conferencing device or manually by the participant after the connection has been made). In the case of the smartphone 502, the software may cause a screen 506 of the smartphone 502 to present control signal actuators on the screen 506. The control signal actuators may include a control signal actuator that, when activated by the participant using the smartphone 502, instructs the smartphone 502 to send a control signal to the conferencing device that instructs the conferencing device to begin receiving video data from the smartphone 502. In the embodiment of FIG. 5A, this may be a "Present" button 510 that, when pressed by the participant, instructs the smartphone 502 to send such a control signal. Once this control signal is sent by the smartphone 502, the conferencing device may enter a state where it is ready to receive video data from the smartphone 502 and the smartphone 502 may begin sending video data to the conferencing device. This video data may be a representation or mirror of the video data that is being displayed in all or part of the screen 506 of the smartphone 502. The participant may then proceed to present their content on a presentation device connected to the conferencing device simply by presenting their content on the screen 506 of the smartphone 502 in the manner that they normally do so.

The control signal actuators may further include a control signal actuator that, when activated by the participant using the smartphone 502, instructs the smartphone 502 to send a control signal to the conferencing device that instructs the conferencing device to stop receiving video data from the smartphone 502. In the embodiment of FIG. 5A, this may be a "Release" button 512 that, when pressed by the participant, instructs the smartphone 502 to send such a control signal. Once this control signal is received by the conferencing device it may stop placing any video data from the smartphone 502 at a video out port for transport to a presentation device. Further, the smartphone 502 may stop sending video data to the conferencing device. Closing the software associated with the conferencing device may have the same effect as operating this control signal actuator.

While the software to control the conferencing device from the smartphone 502 to the conferencing device is active, an indicator 514 may be present on the screen 506 of the smartphone 502. The indicator 514 may change based on whether the software is presently sending video data to the conferencing device. In the embodiment of FIG. 5A, the indicator 514 appears as an outline, which may indicate that the smartphone 502 is not currently providing video data to the conferencing device.

That control signal actuators discussed in relation to embodiments of FIGS. 4 and 5A are software buttons is presented herein by way of example and not by limitation. A control signal actuator in the software associated with the conferencing device may instead be provided in the form of, e.g., a virtual switch, gesture control, voice control, or the like. Further, the functionalities of the software associated with the conferencing device may simply start and stop with the starting and stopping of the software itself.

Figure 5B:
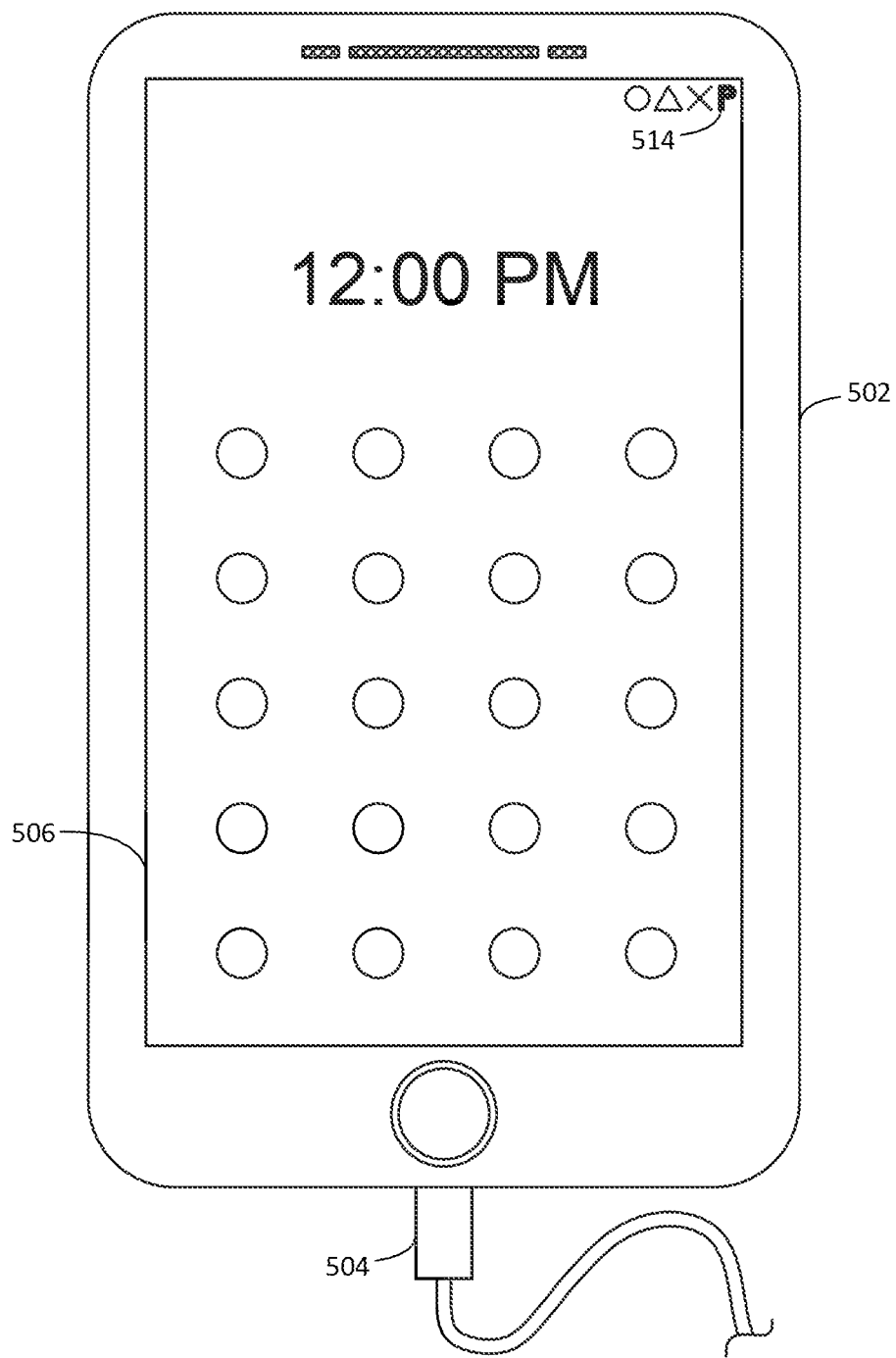
FIG. 5B illustrates a smartphone connected to a conferencing device via a USB cable and running software sending video data to the conferencing device, the software running in the background, according to an embodiment.

FIG. 5B illustrates the smartphone 502 connected to a conferencing device via the USB cable 504 and running software sending video data to the conferencing device, the software running in the background, according to an embodiment. The screen 506 of the smartphone 502 has been changed (by the participant using the smartphone 502) from the content it contained in the embodiment of FIG. 5A to contain different content. All or part of the content currently presented on the screen 506 of the smartphone 502 may currently be contained in the video data being sent by the smartphone 502 to the conferencing device to be placed on a video out port of the conferencing device for transport to and display by the presentation device connected to the video out port. The indicator 514 has been changed from an outline to filled-in form to provide a visual cue to the participant that the screen 506 of the smartphone 502 is currently being displayed by the conferencing device in this manner.

Figure 6:
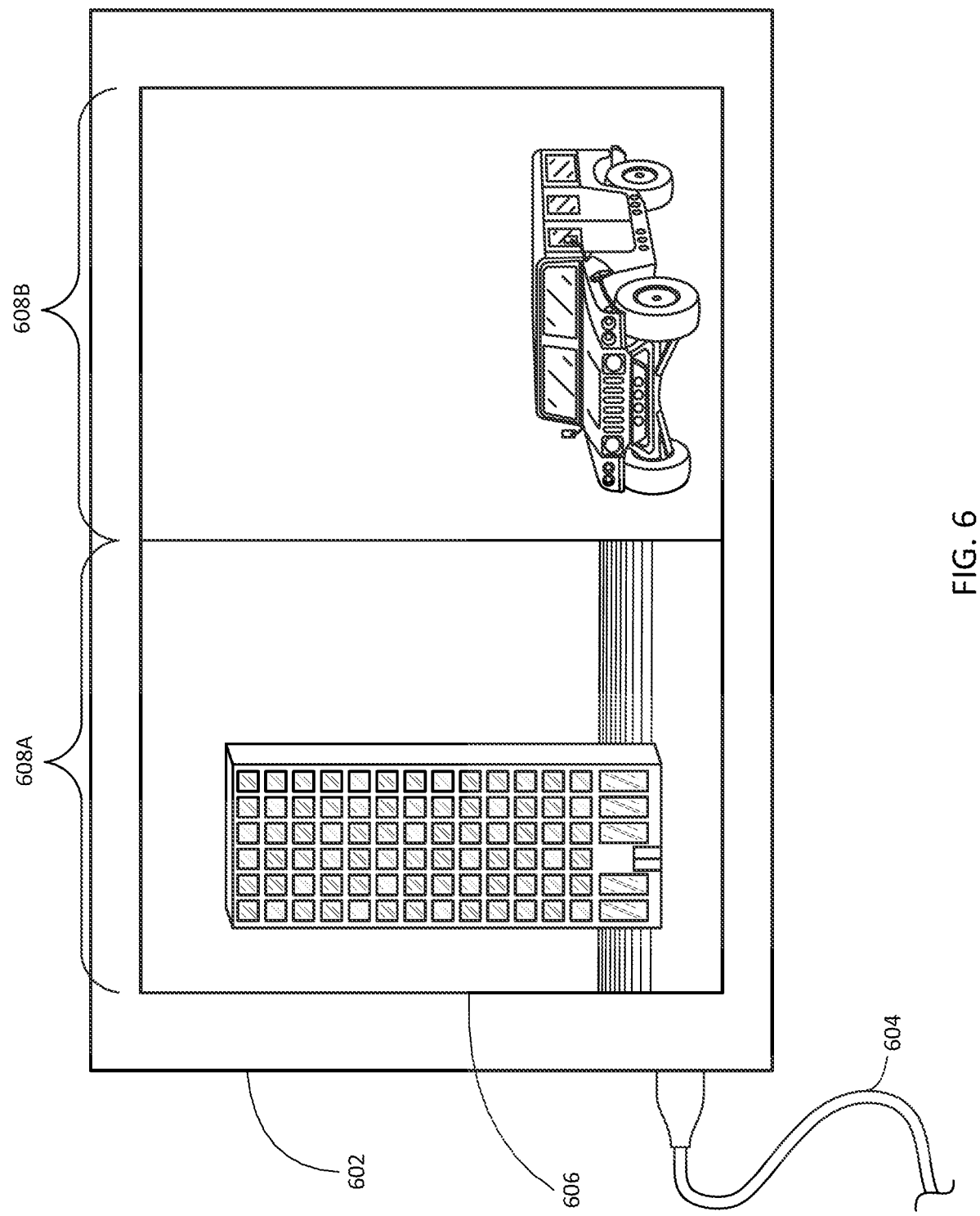
FIG. 6 illustrates a presentation device that is connected to a video out port of a conferencing device via a video cable, the presentation device simultaneously displaying the video data from two different external host devices, according to an embodiment.

FIG. 6 illustrates a presentation device 602 that is connected to a video out module of a conferencing device via a video cable 604, the presentation device 602 simultaneously displaying the video data from two different external host devices, according to an embodiment. A screen 606 of the presentation device 602 has been divided into two content areas 608A and 608B. The first content area 608A may display all or part of the screen of a computer that is connected to the conferencing device and is presently sending the conferencing device video data. The second content area 608B may display all or part of the screen of a smartphone that is connected to the conferencing device and that is presently sending the conferencing device video data.

Figure 7:
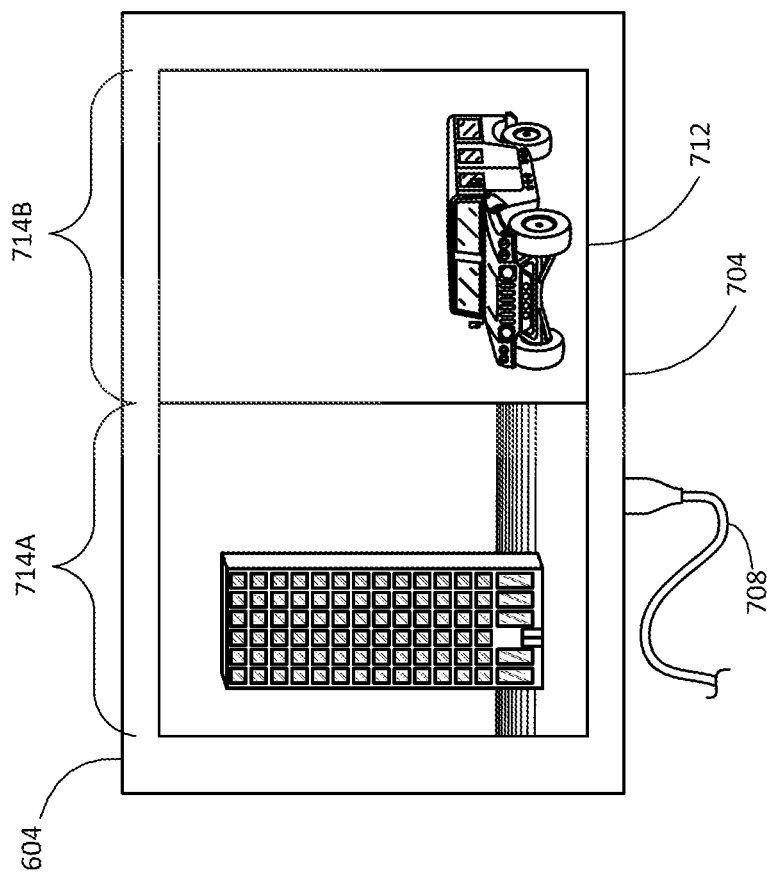
FIG. 7 illustrates two presentation devices, each connected to a video out port of a conferencing device via a video cable, the screens of each presentation device displaying the video data from one or more external host devices, according to an embodiment.
Figure 7:
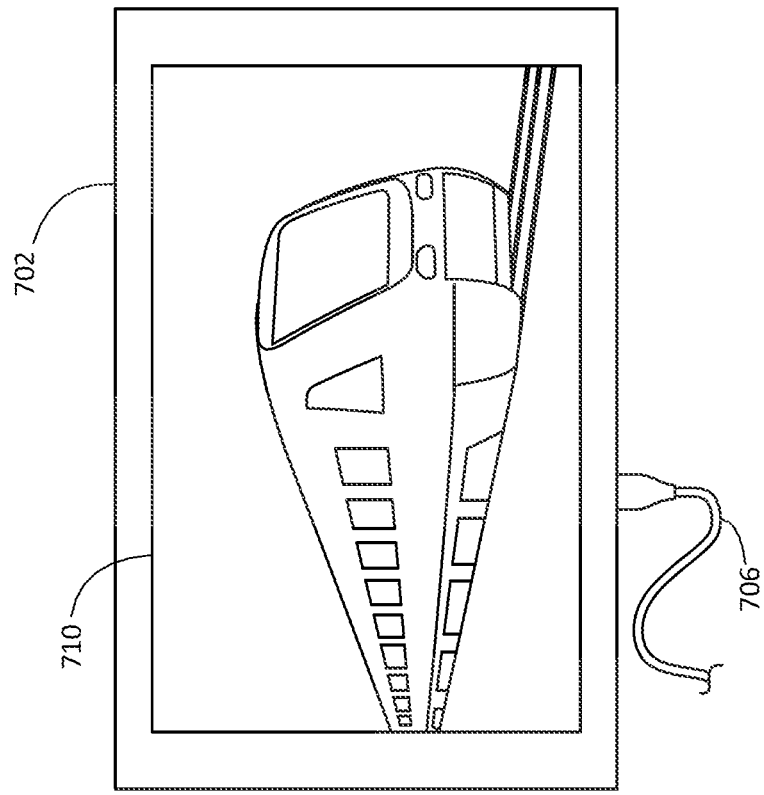

FIG. 7 illustrates two presentation devices 702, 704, each connected to a video out module of a conferencing device via video cables 706, 708, the screens 710, 712 of each presentation device 702, 704 displaying the video data from one or more external host devices, according to an embodiment. The screen 710 of the first presentation device 702 displays the video data from a first smartphone that is connected to the conferencing device. The screen 712 of the second presentation device 704 is divided into two content areas 714A and 714B. The first content area 714A may display all or part of the screen of a second smartphone that is connected to the conferencing device. The second content area 714B may display all or part of the screen of a computer that is connected to the conferencing device.

As also described above in relation to FIG. 2, the conferencing device attached to the presentation devices of FIGS. 6 and 7 may adapt in real time by dividing the one or more screens of said presentation devices to give space to each (or at least a multiplicity) of the external host devices that is connected to the conferencing device and that has sent a control signal to the conferencing device to instruct the conferencing device to receive data from that respective external host device.

Although the embodiments of FIGS. 6 and 7 illustrate presentation devices with cable connections to conferencing devices, it is contemplated that the presentation devices may also be in wireless communication with conferencing devices to receive video data.

Figure 8:
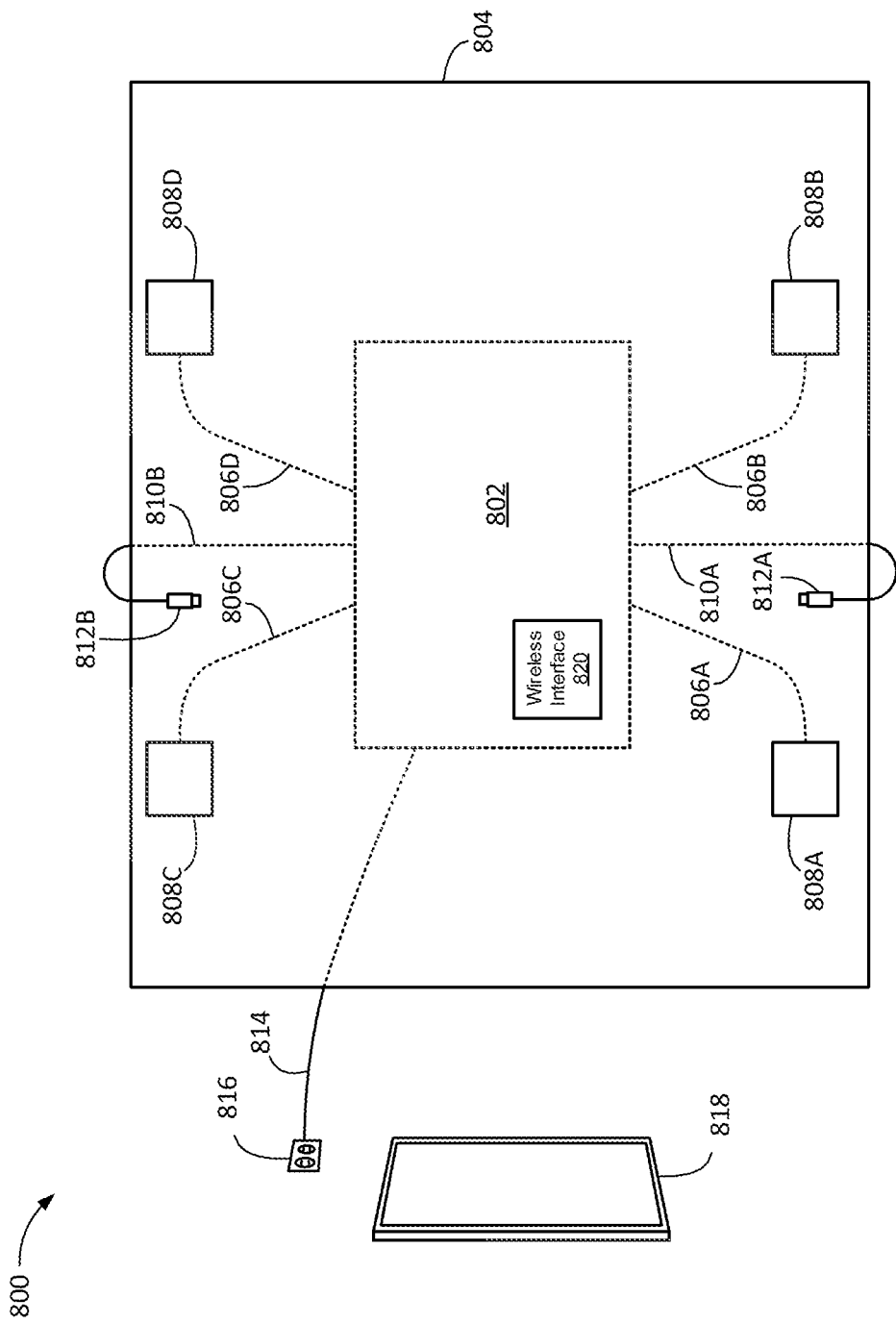
FIG. 8 illustrates a system including a conference room device in a conference room setting, according to an embodiment.

FIG. 8 illustrates an alternative embodiment of a system 800 including a conferencing device 802 in a conference room setting. The conferencing device 802 may include any of the components of the previously disclosed conferencing devices. The conference device 802 may be integrated into, installed underneath, or installed onto a conference table 804.

The system 800 may include a plurality of power cables 806A-D that are connected to the conferencing device 802 and a corresponding wireless charger 808A-D. A wireless charger 808A-D may be any of those conventionally known and enable charging by placing a portable electronic device in proximity with the charger. The power cables 806A-D provide power from the conferencing device 802 to a corresponding wireless charger 808A-D and the power cables 806A-D may be partially or completely integrated into the conference table 804. The wireless chargers 808A-D may be integrated into the conference table 804 or may be separate from the conference table 804. When separate from the conference table 804, the wireless chargers 808A-D may be moved around the table 804 for convenience. Thus embodied, the power cables 806A-D may extend from the table 804 to enable movement of the wireless chargers 808A-D. A participant may place an external host device/portable electronic device, such as a smartphone, tablet, or the like on a wireless charger 808A-D to thereby power the device.

The system 800 may include a plurality of USB cables 210A-B which are attached to a USB hub (not shown) of the conferencing device 802. As in previous embodiments, the USB cables 210A-B may each respectively be a USB-C cable, another USB type, or hybrid USB cables (e.g., where one end is, e.g., USB-C and a second end is, e.g., USB-A) to accommodate various external host devices with USB interfaces. The USB cables 210A-B provide both power and data communication as in previous embodiments. The USB cables 210A-B are coupled to corresponding connectors 812A-B to enable interfacing with an external host device/portable electronic device. The connectors 812A-B may include various adapters to enable data and power communication with a corresponding device.

A power cable 814 is coupled to a conventional wall outlet 816 and a power supply (not shown) of the conferencing device 802. Power received at the power supply may then be provided to the USB hub of the conferencing device 802. Some of this power may then be transported from the USB hub to one or more of the wireless chargers 808A-D and connectors 812A-B. As in previous embodiments, a portion of the power cable 814 may be integrated into, or installed underneath, the conference table 804. In some embodiments, a portion of the USB cables 210A-B and the power cable 814 that is not integrated into, or installed underneath, the conference table 804 may be removably attached to and from the integrated, or underneath, portion of such cable at a location at or near where the cable presents through or away from the conference table 804. Removing the portion of each such cable that is not integrated into, or underneath, the conference table 804 when that cable is not being used may help reduce unnecessary clutter. This optional removability may be accomplished as discussed in previous embodiments.

A presentation device 818 may be in wireless communication with a wireless interface 820 of the conferencing device 802 through WiFi, Bluetooth, or any another conventional means. In this manner, video and audio data may be transmitted from an external host device to the conferencing device 802 and then to the presentation device 818. Alternatively, the presentation device 818 may be in electrical communication with the conferencing device 802 through a cable as in previous embodiments.

An external host device may be configured for wireless communication with the wireless interface 820 to transmit control signals and video/audio data as in previous embodiments. Software may be installed on each participating external host device to enable the device to send video data and/or control signals to the conferencing device 202 when wirelessly connected. The software function may be similar to that previously described. Thus, an external host device may be charged by a wireless charger 808A-D while the external host device communicates wirelessly with the wireless interface 820. During wireless communication, an external host device may control video/audio displayed on the presentation device 818. Alternatively, an external host device may be coupled to a connector 812A-B for power and data communication as in previous embodiments. One of skill in the art will appreciate that the number of power cables 806A-D, wireless chargers 808A-D, USB cables 210A-B, and connectors 212A-B may vary depending on design preferences. Thus, a conferencing device 802 may be configured with a plurality of ports, connectors, and the like to couple to various numbers of power cables 806A-D and/or USB cables 810A-B. Indeed, an embodiment may have a conferencing center with only wireless charging and wireless data transfer to effect the same results discussed herein.

The above description provides numerous specific details for a thorough understanding of the embodiments described herein. However, those of skill in the art will recognize that one or more of the specific details may be omitted or combined with those of another embodiment. Additionally, various methods, components, or materials may be used. In some cases, operations are not shown or described in detail.

The invention claimed is:

1. A conferencing system, comprising:
  a conferencing device communicatively coupled to a presentation device and one or more portable electronic devices, wherein the conferencing device is configured to transmit data, including mirrored video presentation data received from the one or more portable electronic devices to the presentation device;
  a first portable electronic device of the one or more portable electronic devices configured to transmit first mirrored video presentation data to the conferencing device;
  a second portable electronic device of the one or more portable electronic devices configured to transmit second mirrored video presentation data to the conferencing device;
  the presentation device comprising a display, wherein the presentation device is configured to display the first mirrored video presentation data on a first portion of the display and to display the second mirrored video presentation data on a second portion of the display; and the conferencing device further comprising a power supply in electrical communication with a universal serial bus (USB) hub, the power supply configured to power the one or more portable electronic devices, including the first portable electronic device and second portable electronic device, using the USB hub.

2. The conferencing system of claim 1, wherein the first portable electronic device is further configured to transmit the first mirrored video presentation data to the conferencing device via wireless communication, and wherein the second portable electronic device is further configured to transmit the second mirrored video presentation data to the conferencing device via wireless communication.

3. The conferencing system of claim 1, wherein the first portable electronic device is further configured to transmit the first mirrored video presentation data to the conferencing device via the USB communications hub, and wherein the second portable electronic device is further configured to transmit the second mirrored video presentation data to the conferencing device via the USB communications hub.

4. The conferencing system of claim 1, wherein the presentation device is further configured to display the first mirrored video presentation data and the second mirrored video presentation data as a split screen video presentation.

5. The conferencing system of claim 4, wherein the conferencing device is further configured to stop display of the first mirrored video presentation data and the second mirrored video presentation data as the split screen video presentation responsive to a control signal, wherein the first portable electronic device, the second portable electronic device, or combinations thereof, transmit the control signal to the conferencing device.

6. The conferencing system of claim 1, further comprising:
a second presentation device communicatively coupled to the conferencing device; and
a third portable electronic device of the one or more portable electronic devices configured to transmit third mirrored video presentation data to the conferencing device, wherein the second presentation device is configured to display the third mirrored video presentation data on a second display of the second presentation device, and wherein the second presentation device displays the third mirrored video presentation data and the presentation device displays the first and second mirrored video presentation, simultaneously.

7. The conferencing system of claim 6, wherein the second presentation device is further configured to display the third video presentation data on a first portion of the second display.

8. A method comprising;
transmitting, from a first portable electronic device to a conferencing device in communication with a presentation device including a display, first mirrored video presentation data;
transmitting, from a second portable electronic device to the conferencing device in communication with the presentation device including the display, second mirrored video presentation data;
displaying, on the display of the presentation device, the first mirrored video presentation data on a first portion of the display, and the second mirrored video presentation data on a second portion of the display; and providing power, by the conferencing device comprising a power supply in electrical communication with a universal serial bus (USB) hub, to one or more portable electronic devices, including the first portable electronic device and the second portable electronic device using the USB hub.

9. The method of claim 8, wherein the first video presentation data, the second presentation data, or combinations thereof, is transmitted via a wireless connection.

10. The method of claim 8, wherein the first video presentation data, the second presentation data, or combinations thereof, is transmitted via the USB communications hub.

11. The method of claim 8, wherein the first mirrored video presentation data and the second mirrored video presentation data are displayed on the display of the presentation device as a split screen video presentation.

12. The method of claim 8, the method further comprising stopping display of the first mirrored video presentation data and the second mirrored video presentation data responsive to a control signal, wherein the control signal is transmitted by the first portable electronic device, the second portable electronic device, or combinations thereof.

13. The method of claim 8, the method further comprising:
transmitting, by a third portable electronic device, third mirrored video presentation data to the conferencing device; and
displaying, by a second presentation device including a second display and in communication with the conferencing device, the third mirrored video presentation data,
wherein display of the third mirrored video presentation data on the second display of the second presentation device, and display of the first and second mirrored video presentation data on the display of the first presentation device, occurs simultaneously.

14. The method of claim 8, the method further comprising displaying, at the second display of the second presentation device, the third video presentation data on a first portion of the second display.

15. A conferencing device, comprising:
a processor, communicatively coupled to a first and second portable electronic device and a first presentation device comprising a first display, the processor configured to:
receive first and second mirrored video presentation data respectively from the first and second portable electronic devices;
transmit the first and second mirrored video presentation data to the first presentation device;
cause presentation of the first and second mirrored video presentation data on the first display of the first presentation device, wherein presentation of the first mirrored video presentation data occurs on a first portion of the first display, and presentation of the second mirrored video presentation data occurs on a second portion of the first display; and
provide power, via a power supply in electrical communication with a universal serial bus (USB) hub, to one or more portable electronic devices, including the first portable electronic device and second portable electronic device, using the USB hub.

16. The conferencing device of claim 15, wherein the processor is further configured to receive the first and second mirrored video presentation data respectively from the first and second portable electronic devices via a wireless communications network.

17. The conferencing device of claim 15, wherein the processor is further configured to receive the first and second mirrored video presentation data respectively from the first and second portable electronic devices via the USB communications hub.

18. The conferencing device of claim 15, wherein the processor is in communication with a video out module, and wherein the processor is further configured to transmit the first and second mirrored video presentation data to the first presentation device via the video out module.

19. The conferencing device of claim 15, wherein the video presentation data comprises video data, audio data, control signals, or a combination thereof.

20. The conferencing device of claim 15, wherein the conferencing device is local to the first and second portable electronic devices and the first presentation device, and wherein the conferencing device is in communication with a second conferencing device, wherein the second conferencing device is remote from the conferencing device, wherein the conferencing device and the second conferencing device communicate via a network interface.

* * * * *